(12) United States Patent
Fukamachi et al.

(10) Patent No.: US 9,628,670 B2
(45) Date of Patent: Apr. 18, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Hitoshi Fukamachi, Kawasaki (JP); Hiromitsu Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/605,828

(22) Filed: Jan. 26, 2015

(65) Prior Publication Data

US 2015/0213342 A1    Jul. 30, 2015

(30) Foreign Application Priority Data

Jan. 28, 2014    (JP) .................................. 2014-013794

(51) Int. Cl.
G06K 15/02        (2006.01)
H04N 1/60         (2006.01)
G06K 15/12        (2006.01)

(52) U.S. Cl.
CPC ................................ H04N 1/6097 (2013.01)

(58) Field of Classification Search
CPC ................................ G06F 3/12; H04N 1/6097

USPC ................. 358/1.9, 448; 348/273, 294, 340; 345/426, 581
See application file for complete search history.

(56) References Cited

U.S. PATENT DOCUMENTS

2006/0276978 A1* 12/2006 Yamamoto ........... B41J 2/17566
                                                             702/55
2010/0110462 A1*  5/2010 Arai ...................... G06T 15/506
                                                             358/1.9

FOREIGN PATENT DOCUMENTS

JP         2006-177797 A     7/2006
JP         4561483 B2       10/2010

* cited by examiner

Primary Examiner — Quang N Vo
(74) Attorney, Agent, or Firm — Canon USA, Inc., IP Division

(57) ABSTRACT

An image processing apparatus inputs a color signal representing an image and an image quality signal representing a texture of the image. The image quality signal is converted into a physical quantity signal representing a physical quantity. The color material amount for outputting the image is determined based on the color signal and the physical quantity signal. The image quality signal includes a signal representing glossiness value and a signal representing gloss clarity, and the physical quantity representing respective signals are the refractive index and the surface roughness of the image.

11 Claims, 21 Drawing Sheets

FIG. 13

| No | HUE INFORMATION | | | TEXTURE INFORMATION | | |
|---|---|---|---|---|---|---|
| | R | G | B | GLOSSINESS INTENSITY | GLOSSINESS IMAGE CLARITY | GRANULARITY |
| 1 | | | | | | |
| 2 | | | | | | |
| 3 | | | | | | |
| 4 | | | | | | |

FIG. 15

| C | M | Y | K | c | m | gy | L* | a* | b* | REFRACTIVE INDEX | SURFACE ROUGHNESS | DEGREE OF GRANULARITY |
|---|---|---|---|---|---|---|---|---|---|---|---|---|
| 0 | 0 | 0 | 142 | 0 | 0 | 221 | 5.78747 | 0.235788 | 0.404982 | 86.1786 | 52.2003 | 9.0411 |
| 118 | 118 | 0 | 51 | 0 | 0 | 181 | 8.85007 | -0.71204 | -7.46509 | 56.6495 | 41.2483 | 12.413 |
| 171 | 171 | 0 | 14 | 0 | 0 | 127 | 10.317 | -0.76699 | -13.3591 | 51.9364 | 38.8197 | 13.3834 |
| 195 | 195 | 0 | 0 | 0 | 0 | 70 | 11.188 | 0.368667 | -19.2856 | 48.5219 | 36.9825 | 14.4002 |
| 210 | 210 | 0 | 0 | 0 | 0 | 0 | 12.1934 | 1.64621 | -25.6458 | 45.0865 | 35.3802 | 15.5507 |
| 127 | 9 | 79 | 46 | 0 | 0 | 192 | 13.2191 | 3.15429 | -31.3352 | 43.82 | 34.5543 | 16.5349 |
| 197 | 20 | 3 | 22 | 0 | 0 | 162 | 13.8441 | 5.32929 | -37.1512 | 43.4967 | 34.0021 | 17.4673 |
| ⋮ | ⋮ | ⋮ | ⋮ | ⋮ | ⋮ | ⋮ | ⋮ | ⋮ | ⋮ | ⋮ | ⋮ | ⋮ |
| 213 | 81 | 1 | 3 | 0 | 3 | 120 | 14.2866 | 8.06046 | -42.4396 | 42.6616 | 33.4166 | 18.2685 |
| 226 | 132 | 1 | 0 | 0 | 6 | 58 | 14.9624 | 10.9402 | -47.2744 | 42.055 | 33.0945 | 19.1779 |

FIG. 18

| COLOR MATERIAL AMOUNT | | | | COLOR SIGNAL VALUE | | |
|---|---|---|---|---|---|---|
| C | M | Y | K | L* | a* | b* |
| 0 | 0 | 0 | 0 | 5.8 | −0.5 | 0.3 |
| 16 | 16 | 16 | 64 | 13.5 | 2.1 | 2.8 |
| ... | | | | | | |
| 32 | 32 | 32 | 192 | 24.1 | −5.8 | −3.3 |
| 64 | 64 | 64 | 255 | 38.8 | −3.4 | −4.2 |

FIG. 19

| COLOR MATERIAL AMOUNT | | | | PHYSICAL QUANTITY | |
|---|---|---|---|---|---|
| C | M | Y | K | SURFACE REFRACTIVE INDEX | SURFACE ROUGHNESS |
| 0 | 0 | 0 | 0 | 1.2 | 0.3 |
| 16 | 16 | 16 | 64 | 1.3 | 0.5 |
| ... | | | | | |
| 32 | 32 | 32 | 192 | 1.5 | 0.8 |
| 64 | 64 | 64 | 255 | 1.6 | 0.9 |

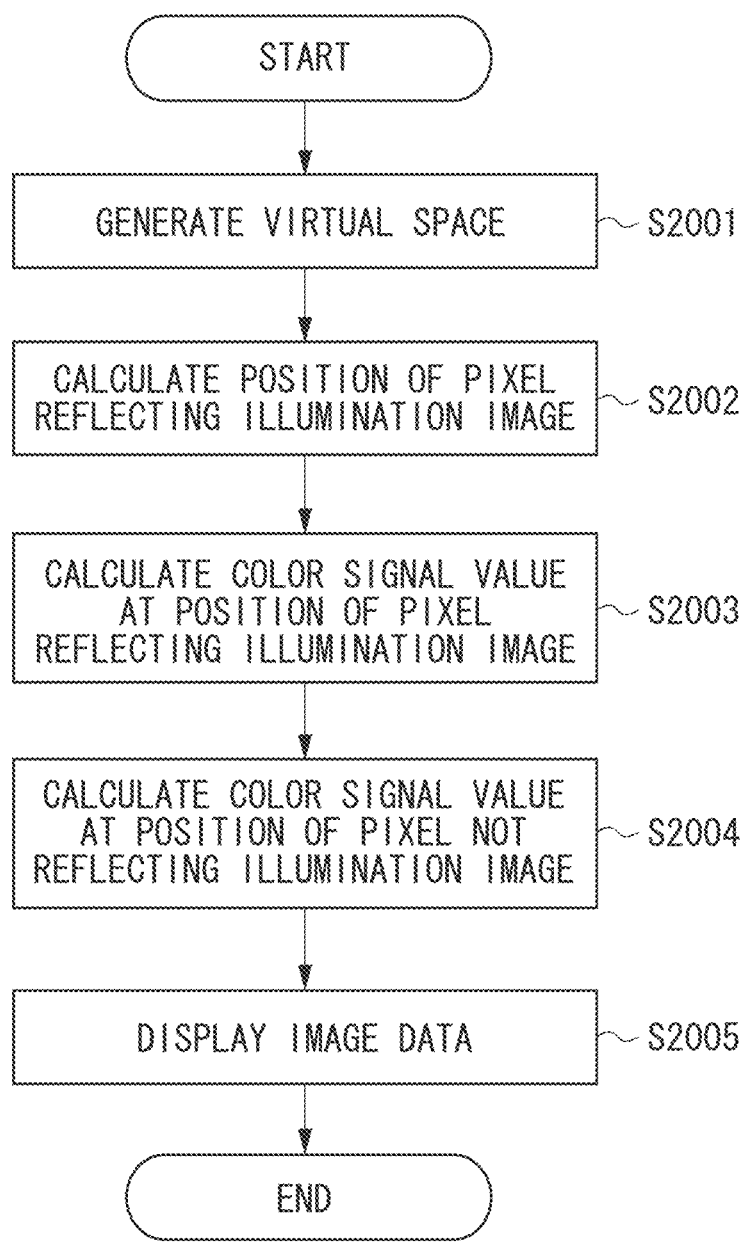

IMAGE PROCESSING APPARATUS, IMAGE PROCESSING METHOD, AND STORAGE MEDIUM

BACKGROUND OF THE INVENTION

Field of the Invention

The present disclosure generally relates to image processing and, more particularly, to an image processing apparatus, an image processing method, and a storage medium for color separation processing.

Description of the Related Art

In an International Color Consortium (ICC) profile that is commonly used in print devices, color material amounts are associated with a device-independent color space such as L*a*b* or XYZ. Examples of color material amounts include cyan (C), magenta (M), yellow (Y), black (K). There are printers with more than ten types of color materials including, in addition to the foregoing color materials, color materials such as red (R), green (G), and blue (B) to reproduce brighter colors and also color materials such as pale cyan (PC), pale magenta (PM), and gray (Gy) to reproduce multi-gradational reproduction.

That is to say, while an image input signal that is conventionally commonly input is three-dimensional or four-dimensional data such as RGB or CMYK, an output of the color separation is data including four to more than ten colors. The dimension number of an output is also high in a case where an input is data that represents colors such as L*a*b* or XYZ as in the case of the ICC profile.

In general, in a case where the dimension number of an output is higher than that of an input, many output solutions exist. For example, in a case of a color separation lookup table (LUT), there exist multiple combinations of CMYK that reproduce one L*a*b*. Concerning existence of the multiple combinations, a well-known color removal (UCR) technique is applied as follows. Suppose that the color material amounts of CMY are (C, M, Y)=(70, 50, 30). From $C'=C-\text{Min}(C,M,Y),$ $M'=M-\text{Min}(C,M,Y),$ $Y'=Y-\text{Min}(C,M,Y),$ and $K=\text{Min}(C,M,Y),$ (C', M', Y', K)=(40, 20, 0, 30) can be obtained. According to a fundamental rule of UCR,
$(C_1, M_1, Y_1, K_1)=(70, 50, 30, 0)$ (Color material amount 1) and $(C_2, M_2, Y_2, K_2)=(40, 20, 0, 30)$ (Color material amount 2) reproduce the same color, although they are different combinations of color material amounts.

The foregoing also applies to a case where colors are associated with color material amounts using a cellular Yule-Nielsen spectral Neugebauer model or the like (Japanese Patent No. 4561483). That is to say, multiple combinations of color material amounts exist for one color.

The multiple combinations of color material amounts can reproduce the same color but have different characteristics in various image quality items such as granularity, which indicates the roughness of an image, color constancy, which indicates a change in color under multiple observation light sources, specular glossiness, and gloss clarity.

The color separation LUT specifies hue information such as L*a*b* or RGB. The color separation LUT stores one combination of color material amounts that are output values with respect to an input value. The technique discussed in Japanese Patent No. 4561483 narrows down the multiple combinations of color material amounts that reproduce the same color to one solution by use of conditions such as a color difference from a target color, color difference under multiple observation light sources, granularity, and a color material amount limiting value that depends on a recording medium. The color separation LUT can store only one combination among the multiple combinations of color material amounts that can reproduce the same color but have different image qualities such as granularity and specular glossiness.

Meanwhile, even if the similar colors of photograph objects are output from a printer, the photograph objects may be diverse such as metal showing a high gloss, fiber showing a low gloss, an object with a rough surface, and an object with a smooth surface (hereinafter, the attribute of an object other than hues, such as gloss and roughness is sometimes referred to as "texture").

However, since the color separation LUT in a current print system stores only one combination of color material amounts for one hue value, the print system cannot reproduce objects that have the same color but different textures.

SUMMARY OF THE INVENTION

The present disclosure is directed to obtaining an output value based on not only hues but also textures in the color separation processing.

According to an aspect of the present disclosure, an image processing apparatus includes an input unit configured to input a color signal representing an image and an image quality signal representing a texture of the image, a conversion unit configured to convert the image quality signal into a physical quantity signal representing a physical quantity, and a determination unit configured to determine a color material amount for outputting the image based on the color signal and the physical quantity signal. The image quality signal includes a signal representing glossiness value and a signal representing gloss clarity, and the physical quantity corresponding to the respective signals are a refractive index and a surface roughness of the image.

According to another aspect of the present disclosure, an image processing apparatus configured to generate reproduction image data representing a reproduction image that reproduces on a display device a color and a gloss of a printed material to be printed by a print apparatus includes an acquisition unit configured to acquire a color signal representing an image, a print condition for printing the image, and a color characteristic of the print apparatus, a color material amount conversion unit configured to convert the color signal into a color material amount based on the print condition, a color signal calculation unit configured to calculate a color signal of the reproduction image from the color material amount based on the color characteristic of the print apparatus, a physical quantity conversion unit configured to convert the color material amount into a physical quantity signal representing a physical quantity, an image quality conversion unit configured to convert the physical quantity into an image quality signal representing a texture of the reproduction image, a gloss color calculation unit configured to calculate a color signal representing a gloss of the reproduction image from the image quality signal, and a generating unit configured to generate the reproduction image data, from the color signal representing the reproduction image and the color signal representing the gloss.

Further features of the present disclosure will become apparent from the following description of exemplary embodiments with standard to the attached drawings.

BRIEF DESCRIPTION OF THE DRAWINGS

FIG. 13 illustrates an example of input image data according to an exemplary embodiment.

FIG. 15 illustrates an example of the LUT configuration according to the second exemplary embodiment.

FIG. 18 illustrates an example of a color material amount/ color signal conversion LUT.

FIG. 19 illustrates an example of a color material amount/ physical quantity conversion LUT.

FIG. 20 is a flow chart illustrating details of a process flow in step S705.

DESCRIPTION OF THE EMBODIMENTS

Figure 1:
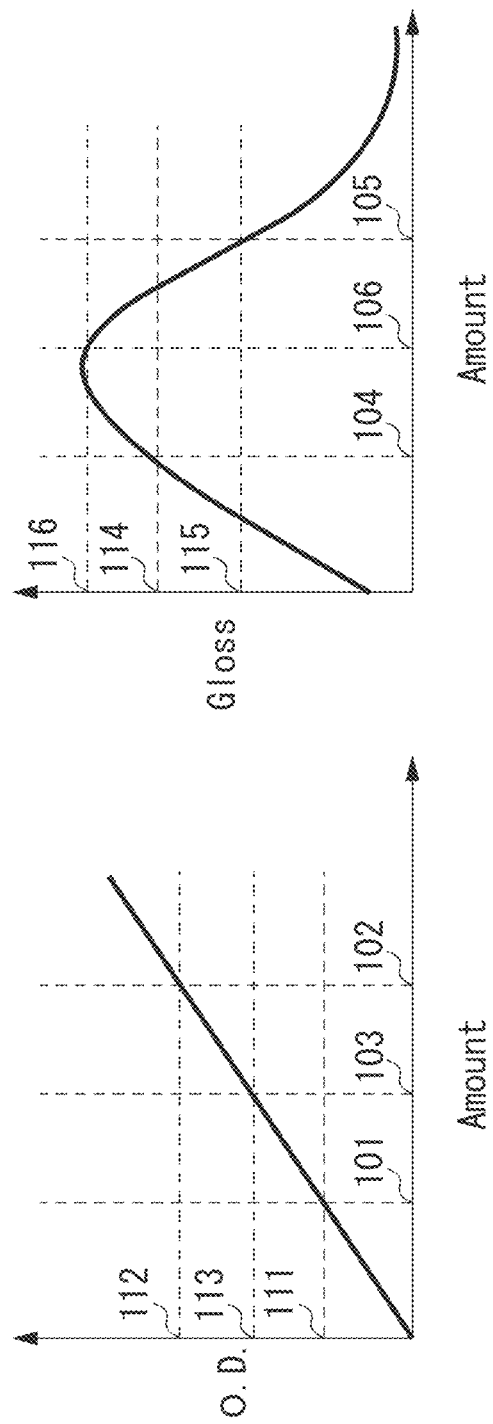
FIGS. 1A and 1B illustrate examples of the relationship between color material amounts and hue values and the relationship between color material amounts and textures.

Various exemplary embodiments, features, and aspects of the disclosure will be described in detail below with reference to the drawings.

Similar components are given the same reference numeral. In the present exemplary embodiment, an image quality item other than hues such as gloss and roughness of an object is sometimes referred to as "texture." Further, the term "physical quantity" refers to a quantity obtained by optically measuring and quantifying various properties such as the degree of granularity, which indicates the roughness of an image, the refractive index of a color material, which relates to gloss, and the surface roughness of a color material on a recording medium.

(Problems in Generating LUTs by Adding Image Quality Items Thereto)

According to the first exemplary embodiment, different combinations of multiple color material amounts that reproduce the same hue value are associated with physical quantities relating to textures so that objects with the same color and different textures can be reproduced.

If is difficult to directly associate an image quality such as specular glossiness with a color material amount to generate an LUT. A solid line in FIG. 1A is an example of a graph showing results of the measurement of density (O. D.), which is an example of the hue value, with respect to amounts of a color material (Amount). As illustrated in FIG. 1A, the color material amount and the density have a high correlation and are suitable for the image processing using a combination of an LUT and interpolation. For example, as for a density 113 corresponding to a color material amount 103 to be obtained by interpolation, a value that is equal or very close to a measurement result can easily be calculated by interpolation from densities 111 and 112 respectively corresponding to color material amounts 101 and 102. Accordingly, a density that corresponds to an arbitrary color material amount between grid points can be calculated by interpolation. This also applies to inverse transformation. Suppose that a density to be calculated by interpolation is the density 113. The color material amount 103 corresponding to the density 113 can easily be calculated by interpolation from the color material amounts 101 and 102 respectively corresponding to the densities 111 and 112. Accordingly, a color material amount that corresponds to an arbitrary density between grid points can be calculated by interpolation.

A solid line in FIG. 1B is an example of a graph showing results of the measurement of specular glossiness (Gloss), which is an example of texture, with respect to amounts of a color material (Amount). In a case where a color material having a relatively higher specular glossiness than a recording medium such as a pigment color material is formed on an image surface, the color material amount and the specular glossiness change as shown by the solid line in FIG. 1B. The reason is as follows. When an amount of a color material is small, if the recording medium having a low specular glossiness is covered with the color material having a high specular glossiness, the specular glossiness is increased. After the entire surface is covered, the specular glossiness decreases because the surface becomes uneven as a result of accumulation of the color material, which scatters specular reflected light.

As illustrated in FIG. 1B, the color material amount and the specular glossiness have a low correlation and are not suitable for the image processing using a combination of an LUT and interpolation. For example, suppose that grid points of an LUT are color material amounts 104 and 105 as illustrated in FIG. 1B and a color material amount 106 is calculated by interpolation. A specular glossiness 116 corresponding to the color material amount 106 cannot be calculated from specular glossinesses 114 and 115 corresponding to color material amounts 104 and 105 by interpolation. In other words, in the case where the specular glossiness 116 is calculated by interpolation, since the specular glossiness 116 exists between the degrees of mirror glossiness 114 and 115, the specular glossiness 116 calculated by interpolation is significantly smaller than the measured specular glossiness 116 illustrated in FIG. 1B. Furthermore, in the case of inverse transformation, no color material amount that realizes the specular glossiness 116 exists.

Accordingly, as for an image quality item that has a low correlation with the color material amount such as the specular glossiness, the control using the combination of an LUT and interpolation is not suitable for the image processing. Examples of an image quality item that has a low correlation with the color material amount other than the specular glossiness include gloss clarity, gloss coloring, etc. Gloss coloring is the coloring of specular reflection because of bronzing or thin film interference.

The arrangement of the grid points in the LUT according to the present exemplary embodiment is not limited. For example, while the grid points may be evenly spaced or arranged, the grid points may be densely arranged at portions where the signal value changes sharply. On the other hand, the grid points may be loosely arranged at portions where the signal value changes little.

<Conversion of Image Quality Item into Physical Quantity>
(Specular Glossiness and Gloss Clarity)
Regarding the definition of the specular glossiness, according to the specular glossiness measurement method defined by the Japanese Industrial Standards Committee (JIS Z 8741), the specular glossiness is calculated by the following formula:

$$G_s(\theta) = \frac{\phi_s}{\phi_{os}} \cdot G_{os}(\theta) \qquad \text{(Formula (1))}$$

where $\phi_s$ denotes a reflected light flux from a sample surface with respect to a defined incidence angle $\theta$, $\phi_{os}$ denotes a reflected light flux from a standard surface with respect to the defined incidence angle $\theta$, and $G_{os}$ denotes a glossiness (%) of the standard surface that is calculated by the following formula (2):

$$G_{os}(\theta) = \frac{\int S_D(\lambda)V(\lambda)\rho(\theta,\lambda)d\lambda}{\int S_D(\lambda)V(\lambda)d\lambda} \cdot \frac{1}{\rho_\theta(\theta)} \times 100 \qquad \text{(Formula (2))}$$

where $S_D(\lambda)$ denotes a relative spectral distribution of standard light $D_{65}$, $V(\lambda)$ denotes a reflected light flux from the standard surface with respect to the defined incidence angle $\theta$, $\rho_0(\theta, \lambda)$ denotes a specular reflectance at the defined incidence angle $\theta$ on a glass surface having a constant refractive index of 1.567 throughout a visible wavelength range, and $\rho(\theta, \lambda)$ denotes a spectral specular reflectance of a primary standard surface at the defined incidence angle $\theta$ that is calculated by the following fresnel formula (3) using a refractive index $n(\lambda)$:

$$\rho(\theta,\lambda) = \frac{1}{2}\left[\left(\frac{\cos\theta - \sqrt{n(\lambda)^2 - \sin^2\theta}}{\cos\theta + \sqrt{n(\lambda)^2 - \sin^2\theta}}\right)^2 + \left(\frac{n(\lambda)^2\cos\theta - \sqrt{n(\lambda)^2 - \sin^2\theta}}{n(\lambda)^2\cos\theta + \sqrt{n(\lambda)^2 - \sin^2\theta}}\right)^2\right] \qquad \text{(Formula (3))}$$

According to specular glossiness measurement conditions specified in JIS Z 8741, the following light source and light receiving element are used. As a light source, standard light $D_{65}$ specified in "Standard illuminants and sources for colorimetry" (JIS Z 8720) is used. As a light receiving element, then element is employed that is equivalent to a combination of a following color-matching function:

$$\overline{y}(\lambda)$$

specified in "Color specification—XYZ color system and X10Y10Z10 color system" (JIS Z 8701), and the same spectral luminous efficiency as the color-matching function.

In other words, if the spectral specular reflectance (hereinafter, "$\alpha(\theta, \lambda)$") of reflected light from an arbitrary specular glossiness measurement sample with respect to the incidence angle $\theta$ is known, the reflected light flux $\rho_s$ from the sample surface in the formula (1) can be simulated (estimated) by the following formula (4):

$$\phi_s = \int S_D(\lambda)V(\lambda)\alpha(\theta,\lambda)d\lambda \qquad \text{Formula (4)).}$$

Similarly, the reflected light flux $\phi_{os}$ from the primary standard surface can be simulated by the following formula (5) using the spectral specular reflectance $\rho(\theta, \lambda)$ of the standard surface in the formula (2):

$$\phi_{os} = \int S_D(\lambda)V(\lambda)\rho(\theta,\lambda)d\lambda \qquad \text{Formula (5)).}$$

More specifically, if the formula (1) is deformed using the formulas (2), (4), and (5), the specular glossiness can be simulated (estimated) by the following formula (6) using the spectral specular reflectance $\alpha(\theta, \lambda)$ of an arbitrary sample with respect to the angle $\theta$:

$$G_s(\theta) = \frac{\int S_D(\lambda)V(\lambda)\alpha(\theta,\lambda)d\lambda}{\int S_D(\lambda)V(\lambda)d\lambda} \cdot \frac{1}{\rho_\theta(\theta)} \times 100. \qquad \text{(Formula (6))}$$

The fresnel formula (3) is applicable to a method for calculating the spectral specular reflectance of reflected light from a sample surface having a known refractive index $n(\lambda)$ with respect to the incidence angle $\theta$.

In the foregoing way, the specular glossiness of a print surface using a combination of color materials is determined by the refractive indexes $n(\lambda)$ of the color materials on the surface and can be interconverted. However, the foregoing formulas are based on specular reflection and the effect of diffusion of specular reflected light due to the irregularities of the surface is not considered.

Figure 2:
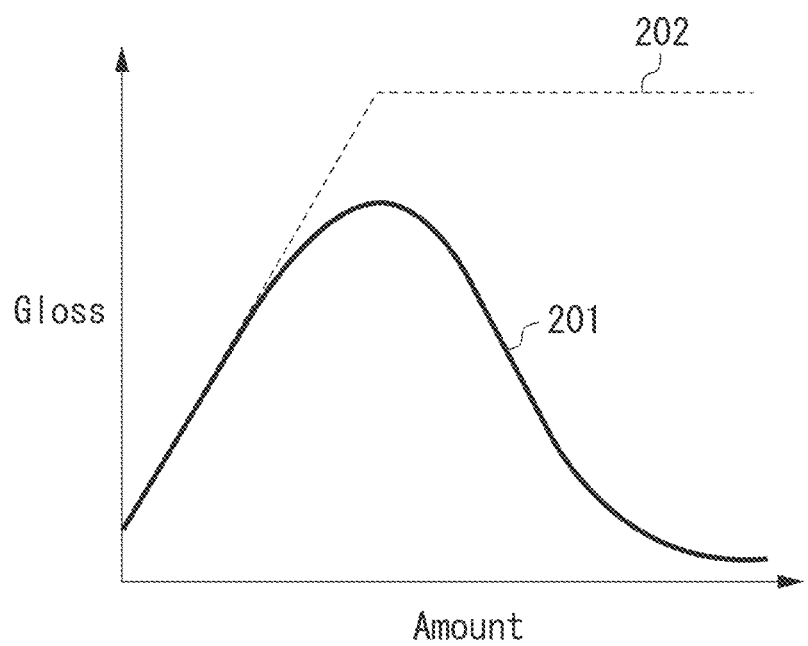
FIG. 2 illustrates the relationship between color material amounts and specular glossiness.

A graph 201 in FIG. 2 shows results of the measurement of the specular glossiness illustrated in FIG. 1B. A graph 202 shows specular glossinesses calculated by the foregoing formula using the refractive index $n_t(\lambda)$ of the color material and the refractive index $n_m(\lambda)$ of the recording medium, which is relatively lower than the refractive index of the color material. As shown by the graph 202, at the color material amount of 0, the specular glossiness that does not consider the surface irregularities depends only on the refractive index $n_m(\lambda)$ of the recording medium. Up to the point where the surface of the recording medium is completely covered with the color material, the specular glossiness increases according to the covering rate based on the refractive index $n_t(\lambda)$ of the color material. From the point where the surface is completely covered with the color material, the specular glossiness depends only on the refractive index $n_t(\lambda)$ of the color material. The difference between the graphs 201 and 202 is due to the effect of the surface irregularities. The rougher the surface shape is, the more the specular reflected light is scattered to decrease the specular glossiness. In other words, a value that corresponds to the surface roughness of an image can be obtained by calculating a difference between the graphs 201 and 202.

The following describes the gloss clarity. The gloss clarity refers to the clearness of a specular reflected light image. In a case where the reflection surface is smooth like a mirror, a specular reflected light image is clear. On the other hand, in a case where the reflection surface is rough and scatters specular reflected light, the specular reflected light image is unclear. In other words, the gloss clarity has a high correlation with the reflection surface roughness.

Figure 3:
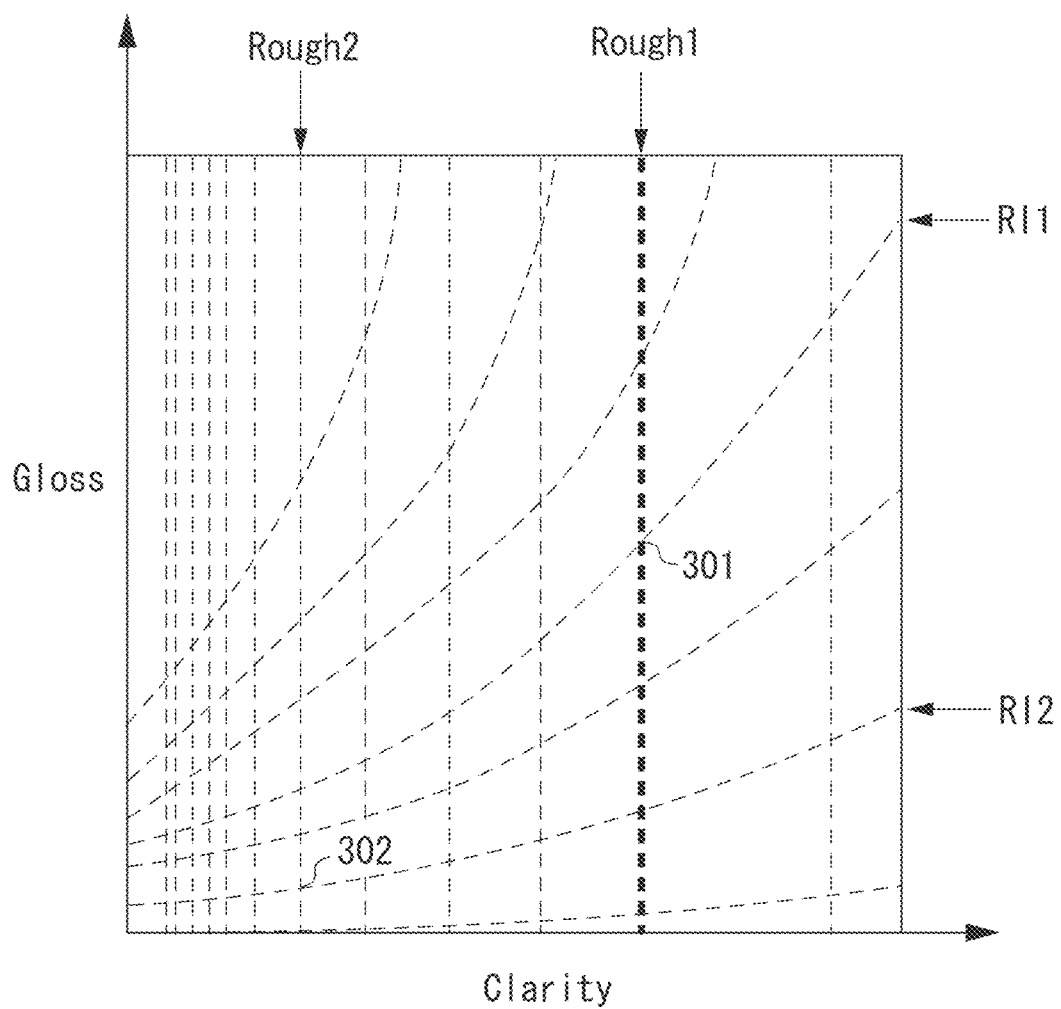
FIG. 3 illustrates an example of the relationship between gloss and physical quantities according to an exemplary embodiment.

Accordingly, the surface refractive index and the surface roughness have a high correlation with the specular glossiness and the gloss clarity, which are image quality items. FIG. 3 illustrates the relationships between the surface refractive index and the surface roughness with respect to the specular glossiness and the gloss clarity that are calculated using the foregoing formula of the specular glossiness. In a graph with the abscissas axis representing the gloss clarity (Clarity) and the ordinate axis representing the specular glossiness (Gloss), a line (contour) connecting values of the same surface refractive index (RI) intersects with a contour of the surface roughness (Rough). Specifically, in a case where the surface refractive index is a surface refractive index RI1 and the surface roughness is a surface roughness Rough1, the gloss clarity and the specular glossiness at an intersection 301 can be obtained. Similarly, in a case where the surface refractive index is a surface refractive index RI2 and the surface roughness is a surface roughness Rough2, the gloss clarity and the specular glossiness at an intersection 302 can be obtained. Inverse transformation is also possible. If the gloss clarity and the specular glossiness are known, the surface refractive index and the surface roughness can be calculated. In other words, the surface refractive index and the surface roughness that correspond to the gloss clarity and the specular glossiness are physical values that are interconvertible.

Figure 4:
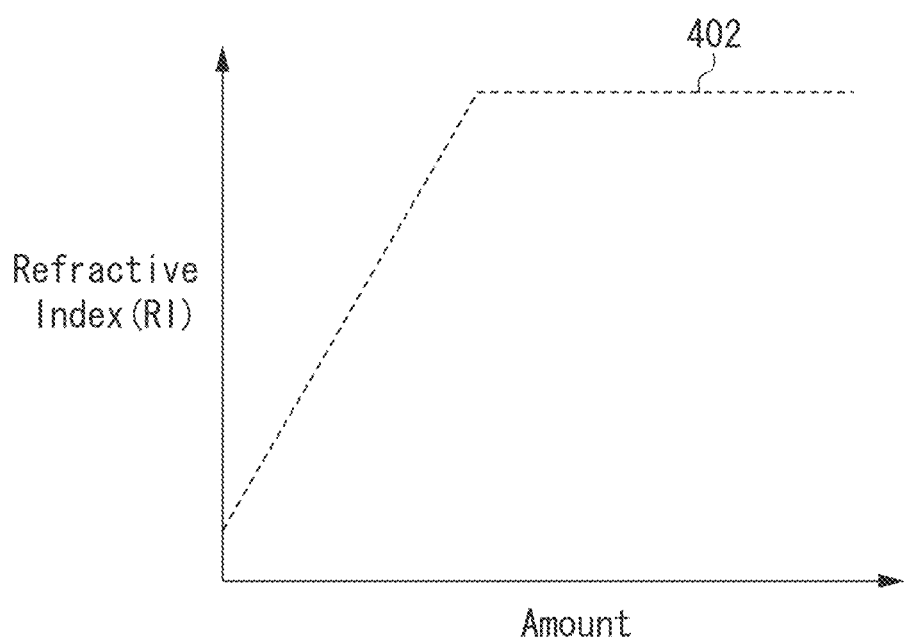
FIG. 4 illustrates the relationship between color material amounts and surface refractive indexes.

Accordingly, even if an image quality item does not have a correlation with the color material amount, as in the case of the color material amount and the specular glossiness, and it is difficult to apply the interpolation using an LUT, the image quality item may be converted into a physical value that is interconvertible so that the physical value has a high correlation with the color material amount. For example, FIG. 4 illustrates the relationship between the color material amount and the surface refractive index. As shown by a graph 402, the color material amount and the surface refractive index have a high correlation and are thus suitable for the control using the LUT and interpolation.

(Gloss Coloring)

A phenomenon of a recorded matter is known in which specular reflected light from an image formed on a recording medium using a pigment color material shows coloring. For example, when an image formed using a pigment color material is placed under a light source such as a spotlight, although the spotlight emits white light, specular reflected light, which is the light reflected by the recording medium, colors. That is, the phrase "specular reflected light shows coloring" means that illumination light reflected by an image formed on a recording medium has a color that is different from the original color of the illumination light. Especially, in an area where a large amount of a cyan (C) color material is used, the color of the area changes to magenta. In a monochrome image using a large amount of a black (K) color material, the color of the entire image changes to yellow.

Figure 5C:
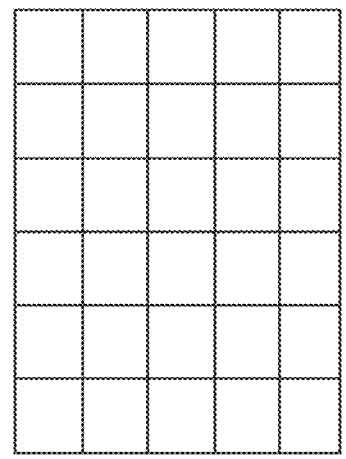
FIGS. 5A, 5B, and 5C illustrate an area gradation.
Figure 5B:
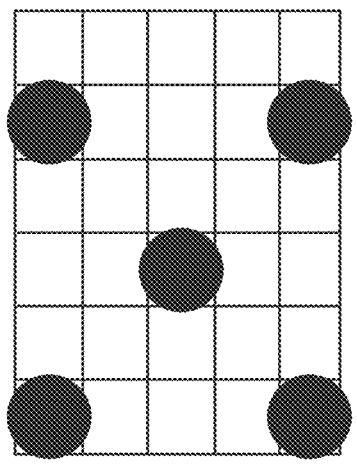
Figure 5A:
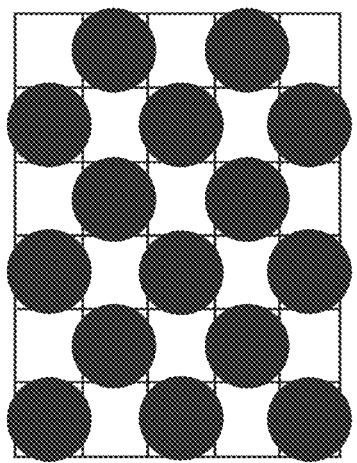

One of the factors that cause the specular reflected light to color is a bronze phenomenon (hereinafter, sometimes referred to simply as "bronze"). What significantly contributes to the bronze is the wavelength dependency of reflection at an interface between an air layer and a color material layer. The wavelength dependency of reflection can be determined from the refractive index $n_i(\lambda)$ of the color material. FIGS. 5A, 5B, and 5C illustrate how a color material shown in black circles is fixed on a recording medium. FIG. 5A illustrates only the recording medium. FIG. 5B illustrates the color material covering about 17% of the recording medium. FIG. 5C illustrates the color material covering about 50% of the recording medium. Suppose that the refractive index of the recording medium is a refractive index $n_p(\lambda)$. Then, the refractive index in FIG. 5A is a refractive index $n_p(\lambda)$. Suppose that the refractive index in FIG. 5B is a refractive index $n_b(\lambda)$. Then, the refractive index $n_b(\lambda)$ can be calculated by the following formula 7:

$$n_b(\lambda) = \frac{17 * n_i(\lambda) + (100 - 17) * n_p(\lambda)}{100}. \qquad \text{(Formula (7))}$$

Similarly, suppose that the refractive index in FIG. 5C is a refractive index $n_c(\lambda)$. Then, the refractive index $n_c(\lambda)$ can be calculated by the following formula 8:

$$n_c(\lambda) = \frac{50 * n_i(\lambda) + (100 - 50) * n_p(\lambda)}{100}. \qquad \text{(Formula (8))}$$

The foregoing indicates that the gloss coloring caused by the bronze changes according to the area ratio between the color material existing on the print surface and the recording medium. In this case, the color material amount and the area ratio of the surface color material have a high correlation. Thus, the control using an LUT and interpolation is possible. While the example illustrated in FIG. 5 is limited to the case where the color material is of one type, multiple types of color materials may be used.

The refractive index and the area ratio of multiple types of color materials are interconvertible with the color of the bronze. The refractive index of each color material type is constant. The area ratio has a significantly high correlation with the color material amount. Thus, the control using an LUT and interpolation is possible.

Figure 6:
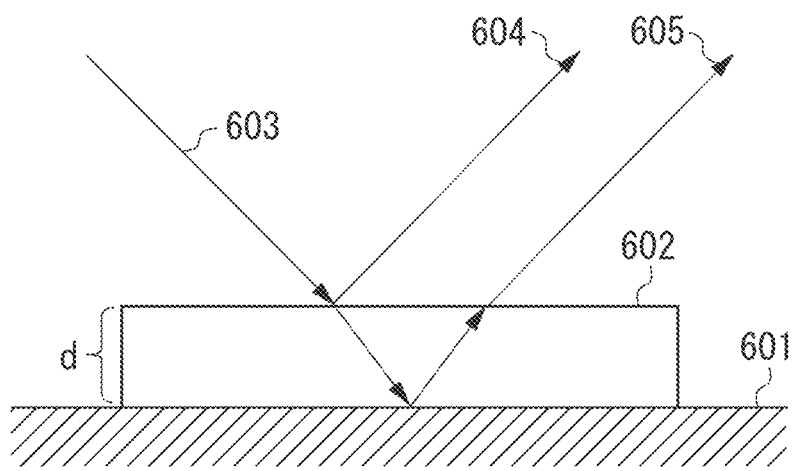
FIG. 6 illustrates thin-layer interference.

On the other hand, in some areas of an image, specular reflected light changes to rainbow colors according to a change in the color material amount. This is a phenomenon called thin-layer interference caused according to the thickness of a thin layer formed by a color material that is spread thin and evenly on a recording medium. FIG. 6 illustrates a thin layer 602 with a thickness d on a recording medium 601. The thin layer 602 is thin and evenly formed using a material that absorbs a relatively small amount of light such as a transparent or pale color material. Light 603 incident on the thin layer 602 is observed as reflected light including surface reflected light 604 and internal reflected light 605 having transmitted the inside of the color material. At this time, optical wavelengths of the surface reflected light 604 and the internal reflected light 605 enhance/weaken each other to cause the reflected light to color. This is a thin-layer interference phenomenon that is commonly known.

Figure 7:
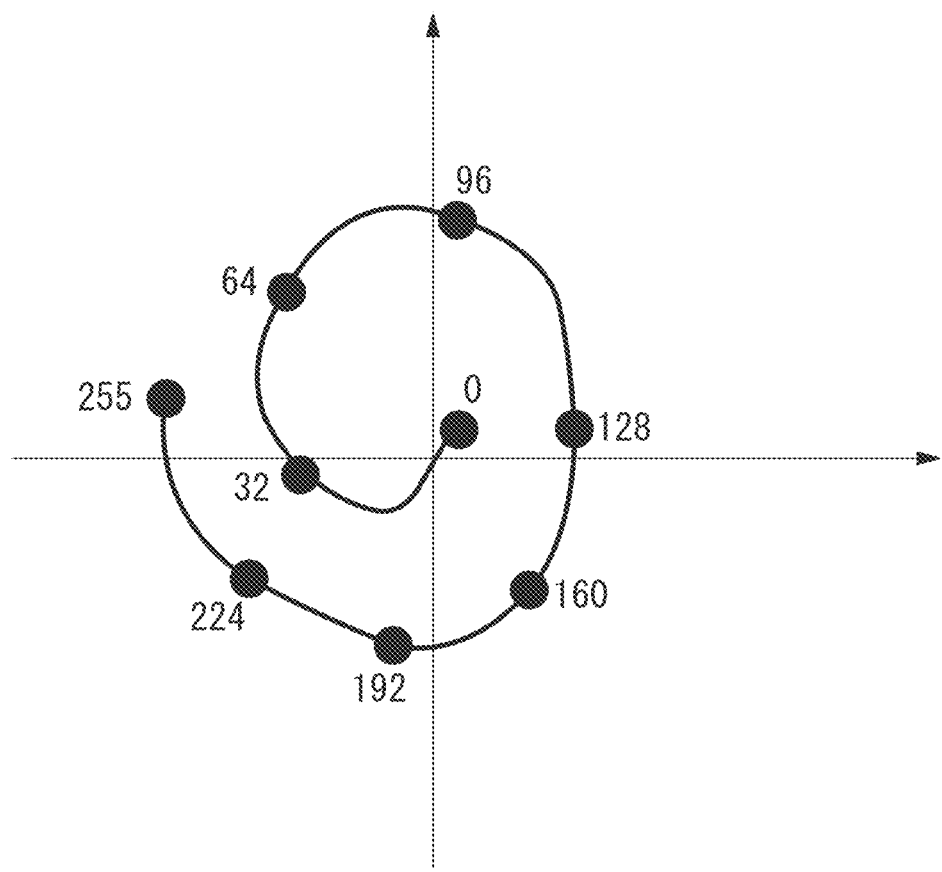
FIG. 7 illustrates an example of gloss coloring result.
Figure 8:
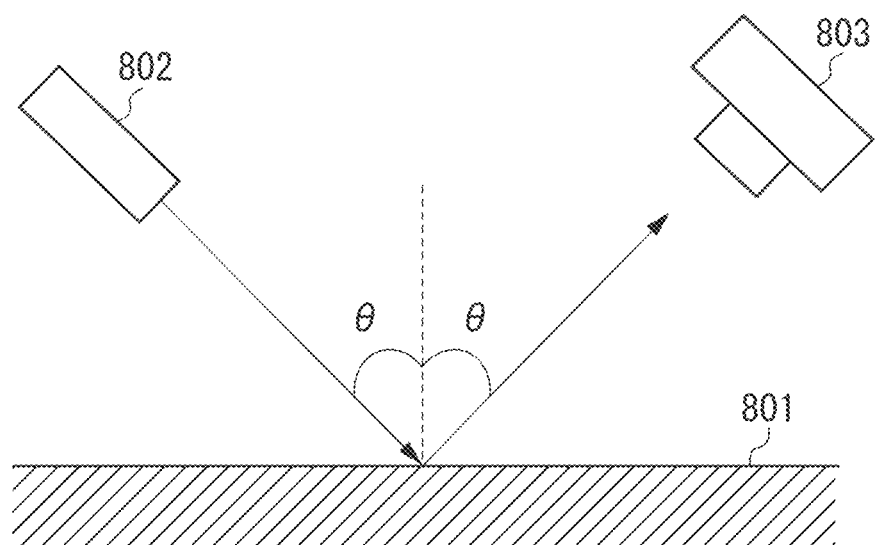
FIG. 8 illustrates an example of a method for measuring gloss coloring according to an exemplary embodiment.

FIG. 7 illustrates the coloring of a thin layer of a colorless, transparent liquid formed on a recording medium by an inkjet technique. The coloring is measured and plotted on the a*b* plane surface of the CIE L*a*b* color system. The coloring was measured using a measurement method discussed in Japanese Patent Application Laid-Open No. 2006-177797. The following describes a method for evaluating numerical values of the coloring of specular reflection that is discussed in Japanese Patent Application Laid-Open No. 2006-177797, with reference to FIG. 8. A light source 802 illuminates a measurement sample 801 from a predetermined angle, and specular reflected light from the measurement sample 801 is detected by a light receiving element 803. The light receiving element 803 detects tristimulus values XxYxZx of the CIE XYZ color system. Tristimulus values XsYsZs of a sample that does not produce the bronze (e.g., black polished glass plate having a refractive index with small wavelength dispersion) are stored in advance to calculate a*b* of the CIE L*a*b* color system from XxYxZx and XsYsZs.

Numerical values illustrated in the graph in FIG. 7 are 8-bit ink values for controlling the ink amount. As illustrated in FIG. 7, in the case where a thin layer is formed using a transparent liquid, the color of specular reflected light changes to go around the hue circle. Therefore, the hue value in the a*b* plane surface of the CIE L*a*b* color system, which is used in a method for evaluating the coloring of specular reflection, has a low correlation with a change in the ink amount. Thus, the hue value cannot be used directly in the LUT processing.

As described above, the thin-layer interference is a phenomenon that occurs when optical wavelengths of the surface reflected light 604 and the internal reflected light 605 enhance/weaken each other, and the change in color depends on a difference in optical path length between the surface reflected light 604 and the internal reflected light 605. Since the optical path length of the internal reflected light 605 depends on the layer thickness d of the thin layer, the gloss coloring can be calculated if the layer thickness d is known. Since the layer thickness d of the thin layer has obviously a high correlation with the ink amount, the LUT processing can be applied to the thin-layer interference by use of the layer thickness. More specifically, as shown in the case of the relationship between the ink amount and the gloss coloring illustrated in FIG. 7, if the layer thickness d changes according to the ink amount, the difference in optical path length between the surface reflected light 604 and the internal reflected light 605 also changes. The hue angle of the coloring of specular reflected light changes according to the difference in optical path length. In the control using an LUT, the changes in the ink amount and the hue angle are controlled.

Other Example

Examples of an image quality item relating to a texture other than the foregoing image quality items having a high correlation with the ink amount include granularity representing the roughness of an image. The granularity is a phenomenon in which dots of a dark color material formed on a pale background or paper white are so distinct that the roughness of the dark color material is perceived. Accordingly, the granularity is closely related to, for example, the brightness of a background, the brightness of a simple dark color material, and an amount of the dark color material.

As described above, the hue value of the background has a high correlation with the amount of every color material output to a unit area including the dark color material, and the hue value of the simple dark color material can be measured in advance. That is to say, when the dark color material and the amounts of all color materials including the dark color material are considered separately, the granularity has a relatively high correlation with the color material amount. Thus, an LUT may be generated by use of, for example, numbers obtained by dividing an amount of a dark color material by a background brightness, without converting the granularity into another physical quantity.

Figure 9:
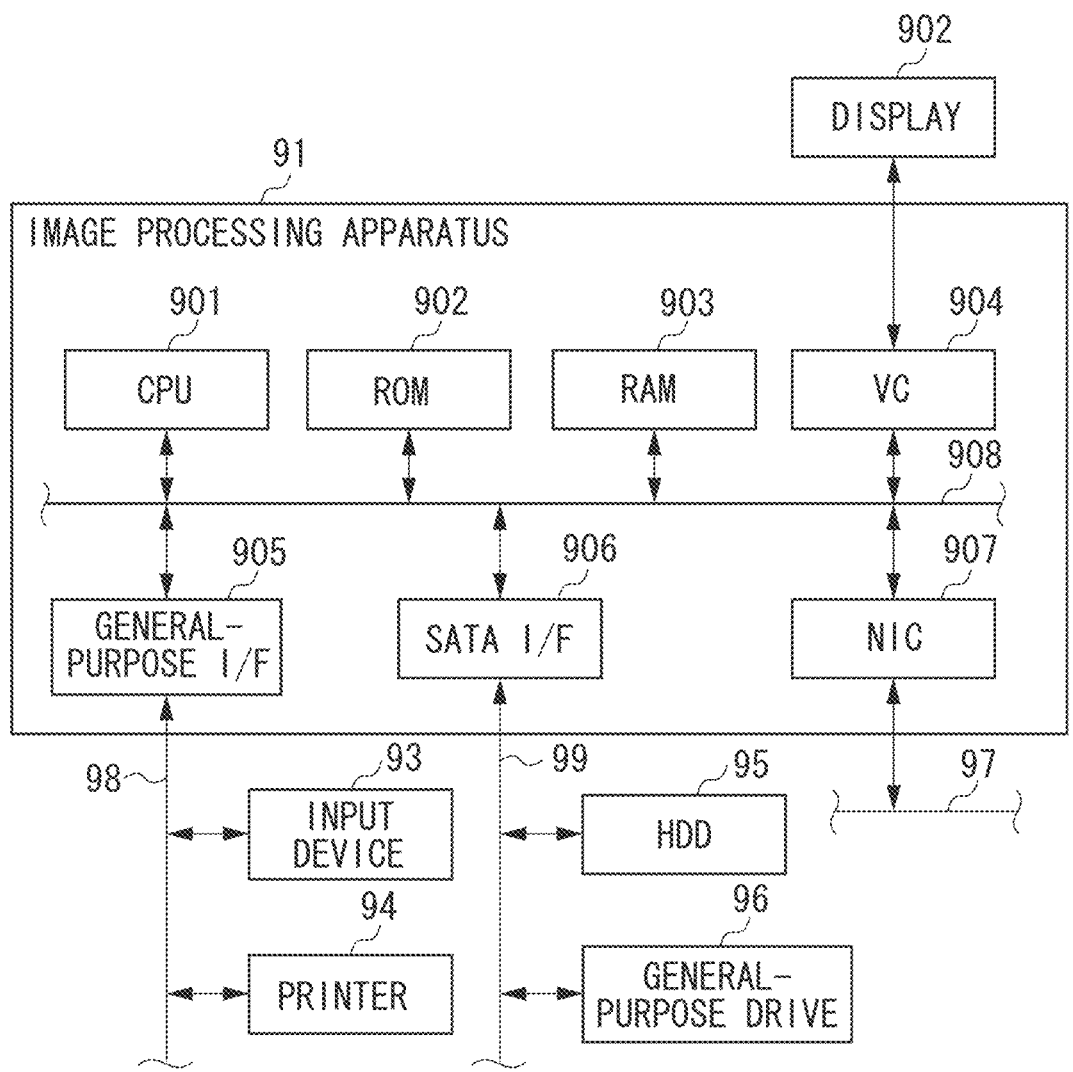
FIG. 9 illustrates the configuration of an image data converting device according to an exemplary embodiment.

<Configuration of Image Processing Apparatus and Process Steps>
(Configuration of Image Processing Apparatus)
FIG. 9 illustrates an example of the configuration of an image processing apparatus 91 according to the present exemplary embodiment.

A central processing unit (CPU) 901 uses a random-access memory (RAM) 903 as a work memory and executes an operating system (OS) and various programs stored in a read-only memory (ROM) 902, a hard disk drive (HDD) 95, and various recording mediums to control each unit via a system bus 908. The programs to be executed by the CPU 901 include a program for image processing or the like described below. As used herein, the term "unit" generally refers to any combination of software, firmware, hardware or other component, such as circuitry, that is used to effectuate a purpose.

A general-purpose interface (I/F) 905 is a serial bus interface such as a universal serial bus (USB). An input device 93 such as a mouse and a keyboard and a printer 94 are connected to the general-purpose I/F 905 via a serial bus 98. The printer 94 is not limited to any particular print method and may be an ink jet printer, an electrophotographic printer, etc.

The HDD 95 and a general-purpose drive 96 configured to read or write to various recording mediums are connected to a serial ATA (SATA) I/F 906. The CPU 901 stores data in the HDD 95 and various recording mediums attached to the general-purpose drive 96.

A network interface card (NIC) 907 is a network interface and connected to a network 97 such as a local area network (LAN). A video card (VC) 904 is a video interface, and a display 92 is connected to the VC 904. The CPU 901 displays on the display 92 a user interface (UI) provided by a program and receives user inputs including user instructions via the input device 93.

Figure 10:
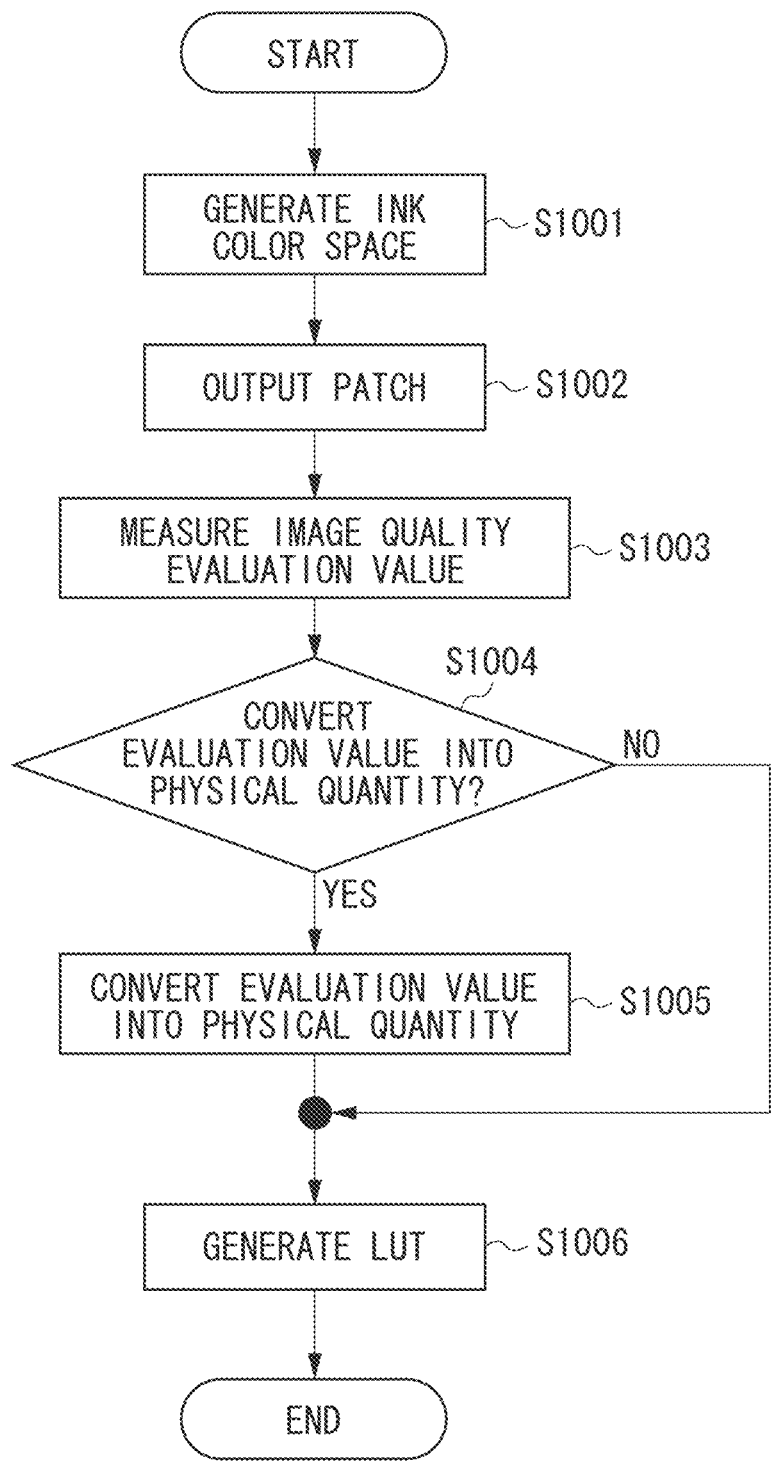
FIG. 10 is a flow chart illustrating an LUT generation process according to the first exemplary embodiment.

(Series of Operations in Process of Generating LUT for Outputting Texture Image)
FIG. 10 is a flow chart illustrating the steps for generating an LUT according to the present exemplary embodiment. The CPU 901 executes each step using the ROM 902 and the RAM 903.

In step S1001, the CPU 901 generates a color material color space defined by a combination of colors of color materials for generating an LUT. The color material color space uses data specified in "Graphic technology—Prepress digital data exchange—Input data for characterization of 4-colour process printing" stipulated by the Japanese Industrial Standards Committee (JIS X 9203), which is used as a combination of CMYK for generating a general ICC profile, and the like. A European Color Initiative (ECI) 2002 chart or the like may also be used. In a case where each color material signal value of CMYK is 8 bits, 256 signal values may be divided into seven groups and quantized into, for example, eight gradation levels. In this case, 8×8×8×8=4,096 combinations are obtained. Further, in a case where a colorless (clear) ink or toner is used in addition to printing colors of subtractive color mixtures, the color material color space may be generated to include the signals of the color materials. The color material color space generated using the combinations is written to the RAM 903 by the CPU 901. If the volume is large, the HDD 95 and the like are also used. When the CPU 901 completes step S1001, the processing proceeds to step S1002.

In step S1002, the CPU 901 outputs via the printer 94 the combinations of color materials that are generated in step S1001.

In step S1003, the CPU 901 measures an image quality item (hereinafter, also referred to as "image quality evaluation value") of the patch output in step S1002. In the measurement performed in step S1003, for example, a hue is measured with a spectral colorimeter and can be converted into the CIE L*a*b*, the CIE XYZ, etc. For the purposes of illustration, the present exemplary embodiment will be described on the assumption that the hue value to be obtained in step S1003 is L*a*b*. With respect to the textures, the following measurement is conducted. The specular glossiness (hereinafter, also referred to as "glossiness value") is measured with a gloss meter. The gloss clarity (hereinafter, also referred to as "image clarity") is measured with an image clarity meter or a haze meter. The gloss coloring may be measured with a measurement device such as a goniophotometer. The granularity may be measured using the RMS granularity or any other known methods. The image quality evaluation values relating to the textures are associated with the combinations of color materials and written to the RAM 903 by the CPU 901. If the volume is large, the HDD 95 and the like are also used. To simplify the description, the following description is based on the the premise that the image quality relating to the hues is the hue value and the image quality relating to the textures is the glossiness value, the gloss clarity, and the degree of granularity. The specular glossiness may be measured or estimated as described above.

In step S1004, the CPU 901 determines whether to convert the image quality evaluation value measured in step S1003 into another physical quantity. The image quality evaluation value refers to the hue value, glossiness value, gloss clarity, and granularity. The physical quantity refers to the surface refractive index and surface roughness described above. In the determination performed in step S1004, whether to convert the image quality evaluation value into a physical quantity is determined based on the correlation between the image quality evaluation value that is to be considered and the color material amount as described above. Specifically, the correlation between the image quality evaluation value and the color material amount is calculated, and whether the correlation is high or low is determined based on whether the calculated correlation is equal to or greater than a predetermined threshold. In the present exemplary embodiment, the CPU 901 determines not to convert the hue value and the degree of granularity because they have a high correlation, while the CPU 901 determines to convert the glossiness value and the image clarity. If the CPU 901 determines to convert the evaluation value into a physical quantity (YES in step S1004), the processing proceeds to step S1005. On the other hand, if the CPU 901 determines not to convert the evaluation value into a physical quantity (NO in step S1004), the processing proceeds to step S1006.

In step S1005, the CPU 901 converts into a physical quantity signal the image quality evaluation value that is to be converted into a physical quantity as a result of a determination in step S1004. In the present exemplary embodiment, the glossiness value and the gloss clarity are converted into a refractive index and a surface roughness. As described above, as to the conversion, the combination of the glossiness value and the image clarity can be interconverted with the combination of the refractive index and the surface roughness.

Figure 11:
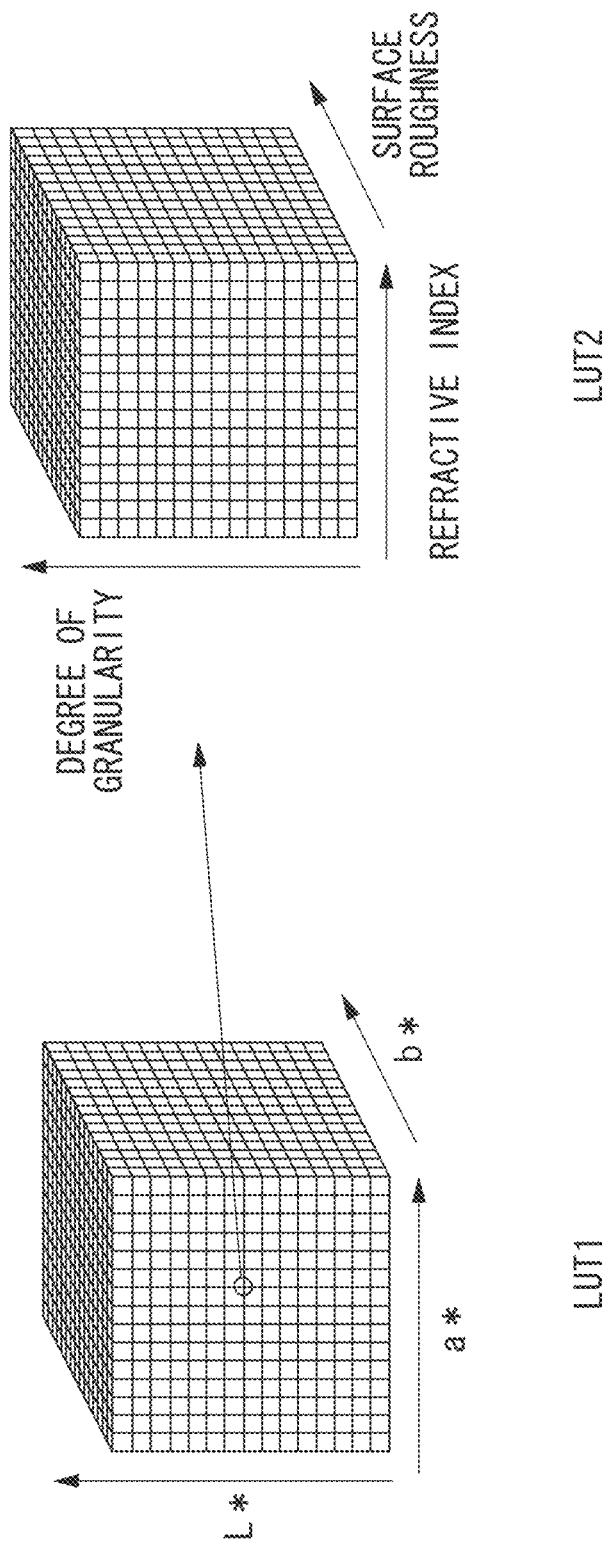
FIG. 11 illustrates an example of the LUT configuration according to the first exemplary embodiment.

In step S1006, the CPU 901 generates an LUT using the data that is measured, converted, and associated with the combinations of color material amounts. FIG. 11 illustrates the LUT configuration according to the present exemplary embodiment. The LUT1 illustrated in FIG. 11, like an ICC profile or device-specific LUT, is a three-dimensional LUT having axes along which the hue values L*a*b* or RGB are respectively plotted. The LUT1 is an example of the LUT and has L*a*b* axes.

While an LUT specifies a color material amount for a grid point having L*a*b* axes, the LUT according to the present exemplary embodiment includes another LUT2 for each grid point. The LUT2 forms a grid with axes along which the converted physical quantity signals are plotted, and each grid point is associated with a color material amount. In the present exemplary embodiment, the LUT2 has the three-dimensional axes of the refractive index, surface roughness, and degree of granularity. In a case where other image quality items relating to a texture are added, the dimension number may be increased to four, five, etc.

The LUT is thus configured to have the multiple LUTs so that the LUT1 can defines multiple combinations of color material amounts that represent the same hue value and the textures can be controlled by the LUT2. To increase the range of the texture control, the LUT2 may contain a combination of color material amounts within an arbitrary range (e.g., color difference of one) for each grid point of the LUT1.

The generated LUT is written to the RAM 903 by the CPU 901. If the volume is large, the HDD 95 and the like are also used. The LUT is also output to the general-purpose drive 96 or the network 97 via the NIC 907 and used in a texture image output process in another system, which will be described below.

(Series of Operations in Texture Image Output Process)

Figure 12:
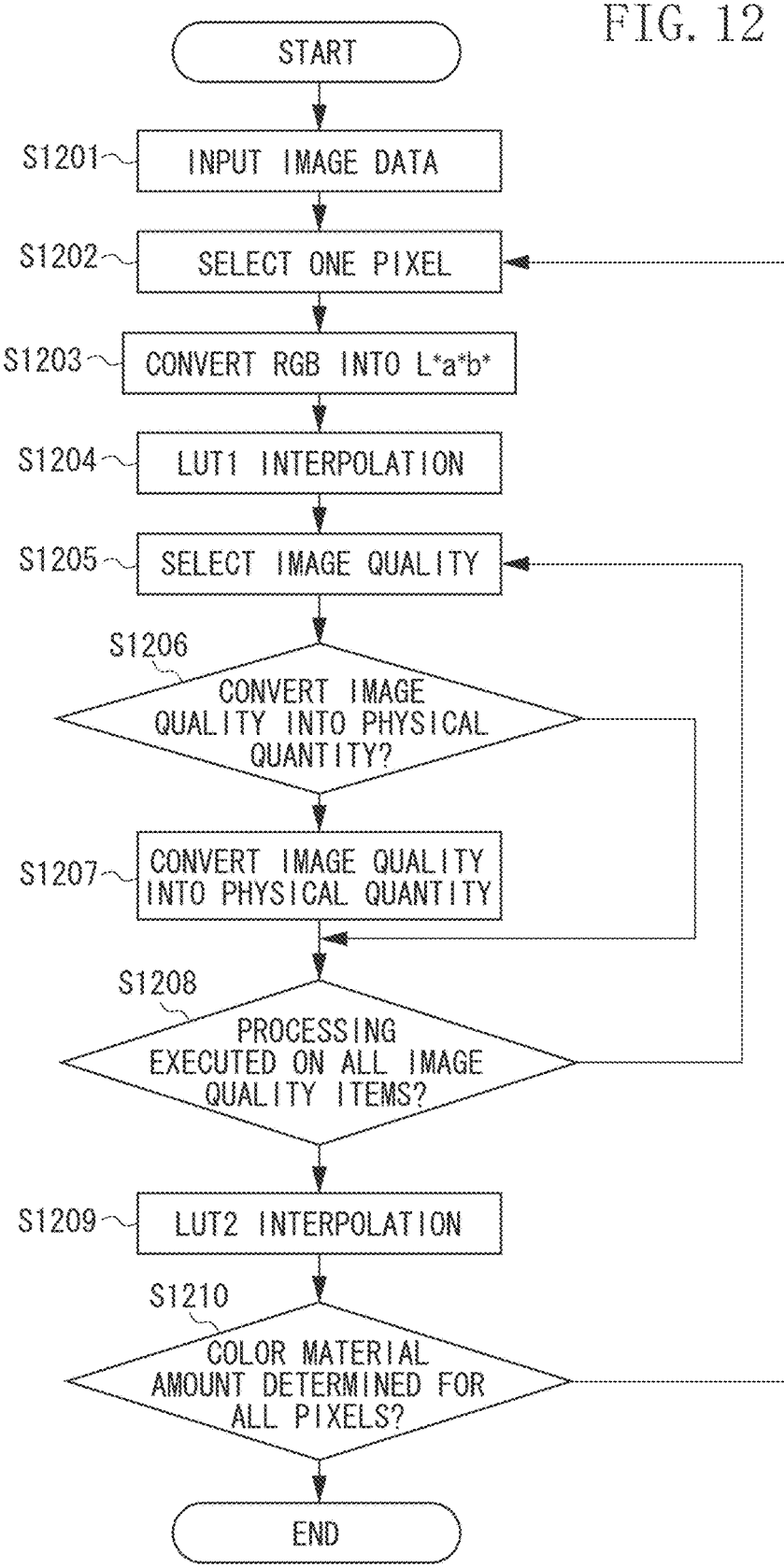
FIG. 12 is a flow chart illustrating an image data conversion process according to the first exemplary embodiment.

FIG. 12 is a flow chart illustrating the steps in an image data conversion process relating to the texture image output process according to the present exemplary embodiment.

First, in step S1201, output target image data is input. The input image data in the present exemplary embodiment contains information indicating an image quality in addition to normal RGB images. The information indicating an image quality may be defined for each pixel or each image area.

FIG. 13 illustrates examples of input images. In FIG. 13, examples of input image information about each of four image sets are illustrated. Each image indicates RGB information as hue information and image information as texture information such as the glossiness value, gloss clarity, and granularity. Each image that indicates texture information may simultaneously hold hue information and texture information, or each image may be for one information. Further, while RGB are used as hue information in FIG. 13, CMYK or Lab may also be used.

The four image sets illustrated in FIG. 13 have the same hue information, and only the texture information is different. Image No. 1 shows an example in which the glossiness value and the gloss clarity of the entire image are set high. Image No. 2 shows an example in which the glossiness value and the gloss clarity of a background portion of the image are set low. Image No. 3 shows an example in which the glossiness value of the background portion is set to an intermediate level and the granularity is set low. Image No. 4 is an example in which the granularity is set high. The textures are set as image data as described above, so that texture information as well as hue information can be obtained for each pixel or area of the image.

The texture information is not limited to the glossiness value, gloss clarity, and granularity. For example, the gloss coloring may also be designated as the texture information. In this case, information corresponding to a*b* or information corresponding to RGB may be input as gloss coloring control information.

The CPU 901 reads image information from the HDD 95. The CPU 901 may also read image information from the general-purpose drive 96 or the network 97 via the NIC 907. The input image information is written to the RAM 903 by the CPU 901 for the subsequent processing. If the volume is large, the HDD 95 and the like are also used.

In step S1202, the CPU 901 selects one pixel for the subsequent conversion processing from the image input in step S1201. The hue information and texture information of the selected pixel is written to the RAM 903 by the CPU 901.

In step S1203, first, RGB, which is hue information, is converted into L*a*b*, which is device-independent hue information. The device-independent hue information is not limited to L*a*b*, and a space such as XYZ or CIECAM may also be used. The conversion from RGB to device-independent hue information is the conversion to the axes of the LUT1 illustrated in FIG. 11. As described above, for example, the axes of the LUT1 may be RGB. In this case, the conversion is not executed. The conversion is not executed also in a case where the axes are device-independent hue information and the input hue information is from the start device-independent hue information. The converted hue information is written to the RAM 903 by the CPU 901.

In step S1204, the CPU 901 interpolates the LUT1. The CPU 901 performs calculations to interpolate the LUT1 by use of known tetrahedral interpolation, cubic interpolation, etc.

In step S1205, the CPU 901 selects at least one of the image quality information input in step S1201, e.g., the glossiness value, gloss clarity, and granularity. In the case where the input image quality information is image No. 1 illustrated in FIG. 13, the glossiness value and the gloss clarity are selected first. In a case where there is other image quality information, the processing returns from step S1208, and the CPU 901 selects next image quality information. The selected glossiness value information and the selected gloss clarity information are written to the RAM 903 by the CPU 901.

In step S1206, the CPU 901 determines whether to convert the image quality signal selected in step S1205 into another physical quantity. In the case where the glossiness value and the gloss clarity are selected, these image quality signals are converted into the refractive index and the surface roughness as described above. In this case, as illustrated in FIG. 4, the color material amount and the converted surface refractive index have a high correlation with each other. Thus, as illustrated in FIG. 3, the CPU 901 determines to convert the glossiness value and the image clarity into the surface refractive index and the surface roughness which have a high correlation with the color material amount (YES in step S1206), and the processing proceeds to step S1207.

Figure 14:
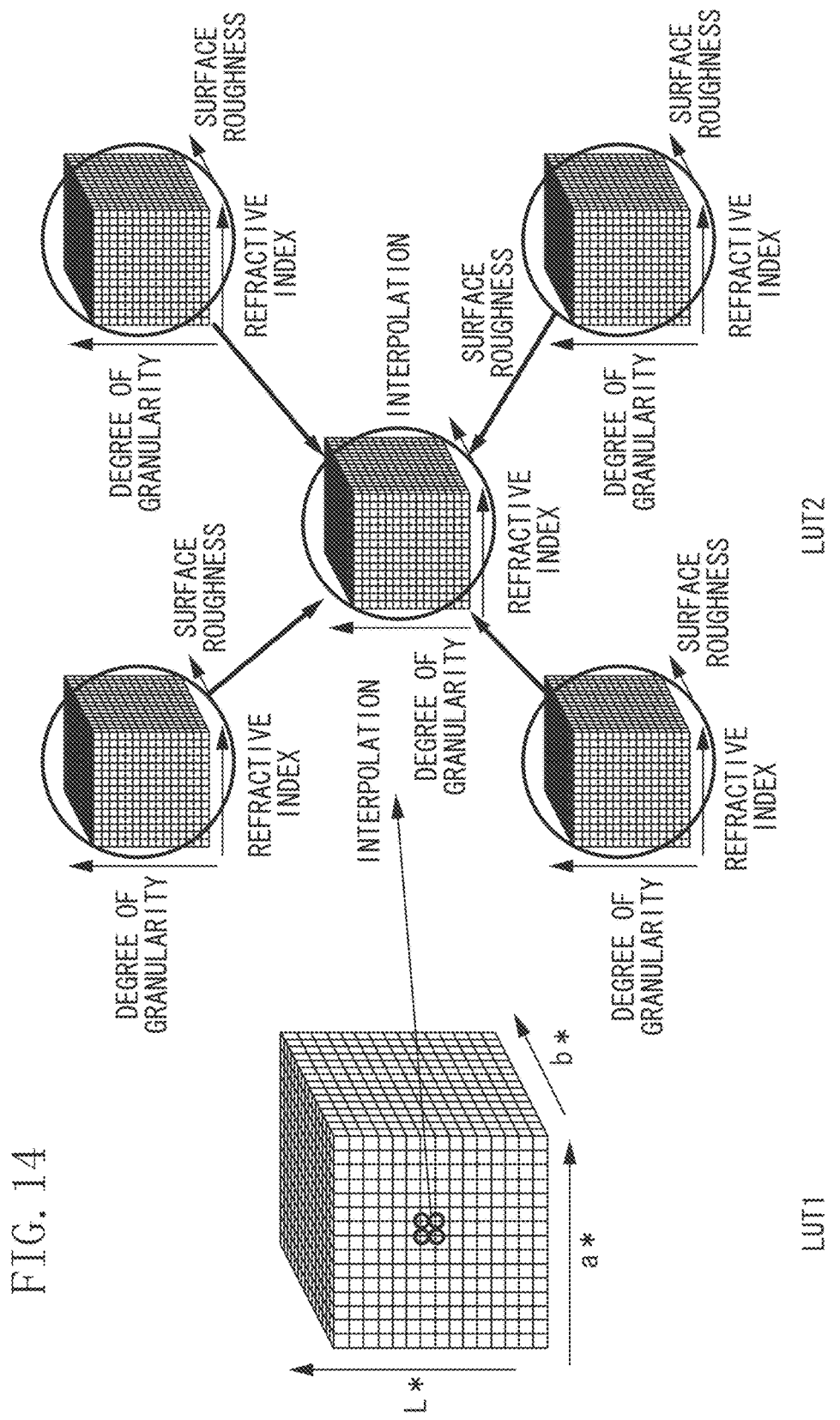
FIG. 14 illustrates an example of the interpolation of a data conversion LUT according to the first exemplary embodiment.

On the other hand, the CPU 901 determines not to convert the image quality evaluation value such as hue information and granularity as to which the image quality evaluation value has a high correlation with the color material amount and the correlation does not increase even if the image quality evaluation value is converted into another physical information (NO in step S1206), and the processing proceeds to step S1208. Even if it is determined that an image quality is not to be converted, it needs to be converted into a relative image quality signal if the input image quality signal is, for example, an 8-bit image signal as illustrated in FIG. 13. In a case where the image quality that is not to be converted is the degree of granularity, as illustrated in FIG. 14, the smallest and largest values of the degree of granularity of the LUT2 interpolated in step S1204 are clipped at 8-bit 0 and 8-bit 255 and normalized, whereby the image quality is converted into a degree of granularity that is reproducible.

In step S1207, the CPU 901 converts into a physical quantity signal the image quality signal determined in step S1206 to be converted. For example, the glossiness value and the gloss clarity are converted into the refractive index and the surface roughness, and the gloss coloring is converted into the layer thickness of the thin layer as described above. The conversion results are written to the RAM 903 by the CPU 901. If the volume is large, the HDD 95 and the like are also used. In a case where the image quality signal to be converted in step S1207 is eight bits as illustrated in FIG. 13, as in the normalization performed in step S1206, the image quality signal needs to be converted into a relative physical quantity signal. For example, in a case where the image quality signals to be converted are the glossiness value and the gloss clarity, as in FIG. 14, the smallest and largest values of the refractive index and the surface roughness of the LUT2 interpolated in step S1204 are clipped at 8-bit 0 and 8-bit 255 and normalized. By the normalization, the image quality is converted into a physical quantity signal that is reproducible.

In step S1208, the CPU 901 determines whether all the image quality items contained in the image input in step S1201 has undergone steps S1206 and S1207. If the CPU 901 determines that not all the image quality items has undergone steps S1206 and S1207 (NO in step S1208), the processing returns to step S1205. On the other hand, if the CPU 901 determines that all the image quality items has undergone steps S1206 and S1207 (YES in step S1208), the processing proceeds to step S1209.

In step S1209, the CPU 901 performs interpolation processing using the LUT1 generated by interpolation in step S1204 based on the image quality signal converted or not converted according to the determination result in step S1206, thereby calculating the color material amount. The CPU 901 performs the interpolation processing using a known interpolation technique such as cubic interpolation or tetrahedral interpolation as described above. The interpolation result is written to the RAM 903 by the CPU 901 as a color material amount that reproduces the texture of the pixel of the input image that is selected in step S1202. If the volume is large, the HDD 95 and the like are also used.

In step S1210, the CPU 901 determines whether the color material amount is determined for all the pixels of the image input in step S1201. If the CPU 901 determines that the color material amount is not determined for all the pixels (NO in step S1210), the processing returns to step S1202. On the other hand, if the CPU 901 determines that the color material amount is determined for all the pixels (YES in step S1210), the processing ends.

In the foregoing way, even when an image quality item having a low correlation with the color material amount is input, a color separation output value based on not only the hues but also the textures can be obtained.

A second exemplary embodiment will be described below. While in the first exemplary embodiment, the example is described in which the conversion from the hue information and the image quality information or the image quality information converted to the physical quantity signal into the color material amount is determined by a process using two LUTs including the LUT1 and the LUT2, a single multidimensional LUT may be used.

FIG. 15 illustrates an example of a multidimensional LUT. Input dimensions are color material colors such as C, M, Y, K, c, m, and gy corresponding to cyan, magenta, yellow, black, pale cyan, pale magenta, and pale black, respectively. Output dimensions are hue information L*a*b*, refractive index, surface roughness, and degree of granularity.

In this way, the color material amount can be associated with the image quality information or the image quality information converted into the physical quantity signal in the same LUT. In other words, the processing of step S1204 in FIG. 12 is executed in step S1209.

The following describes the processing of step S1209 according to the present exemplary embodiment using the degree of granularity as an example. The L*a*b* values calculated in step S1203 are sorted using the CIE color difference formula such that the color difference does not exceed an arbitrary value. From among the corresponding combinations of color material amounts that are obtained as a result of the sorting, while the smallest and largest values of the degree of granularity are considered to be 8-bit 0 and 8-bit 255, the degree of granularity is converted into a degree of granularity that can be reproduced by the pixel. The interpolation processing to be performed on the converted degree of granularity and subsequent processing are similar to those in the first exemplary embodiment. In other words, the image quality item is selected in advance to execute the interpolation processing on the image quality signal following the interpolation processing on the hue value.

In the foregoing way, the second exemplary embodiment can be realized by the single multidimensional LUT.

A third exemplary embodiment will be described below. The following describes an exemplary embodiment about the soft proofing in which a tint is checked on a display without outputting a printed material. Components that are similar to those in the exemplary embodiments described above are given the same reference numerals.

In recent years, not only the matching of tints of a printed material but also reproduction of the texture of the printed material is demanded in the proofing. The texture of a printed material as used herein refers to, for example, the state of a material surface of an object having high specular reflected light (glossiness value) such as metal or an object having low specular reflected light (glossiness value) such as fiber. In addition, the characteristic called image clarity is important for specular reflected light. The image clarity is an index that indicates how much an illumination image reflected by an object blurs. The image clarity of a mirror-finished surface is relatively high, whereas the image clarity of an object such as fiber is low. To estimate the color and gloss (glossiness value and image clarity) of a print material in the soft proofing, it is necessary to acquire in advance the color and gloss characteristics that can be reproduced by a printer.

However, in acquiring the printer-reproducible characteristics, while the color characteristic is relatively linear with respect to the color material amount, the gloss characteristic is not linear with respect to the color material amount. Thus, in a case where the color material amount is separated with arbitrary spaces to generate patches and, for example, the gloss intensities are measured to calculate a glossiness value between the patches by interpolation, if the number of patches is smaller, the space between the patches becomes larger, which decreases the estimation accuracy. In other words, when the measured values of output patch images in which the color material amount is changed in a larger interval, are linearly interpolated, the accuracy is low. If the number of patches is increased, the accuracy increases, but a significant amount of time would be required for the measurement and output.

The present exemplary embodiment uses a physical value that has a high linearity with respect to the color material amount, so that the printer characteristics can be estimated with high accuracy from a small number of patches (measured value). The estimation result is used to accurately reflect the gloss characteristic, which differs among colors, to the soft proof image processing, so that a print image can be presented on a display device such as a display.

Figure 16:
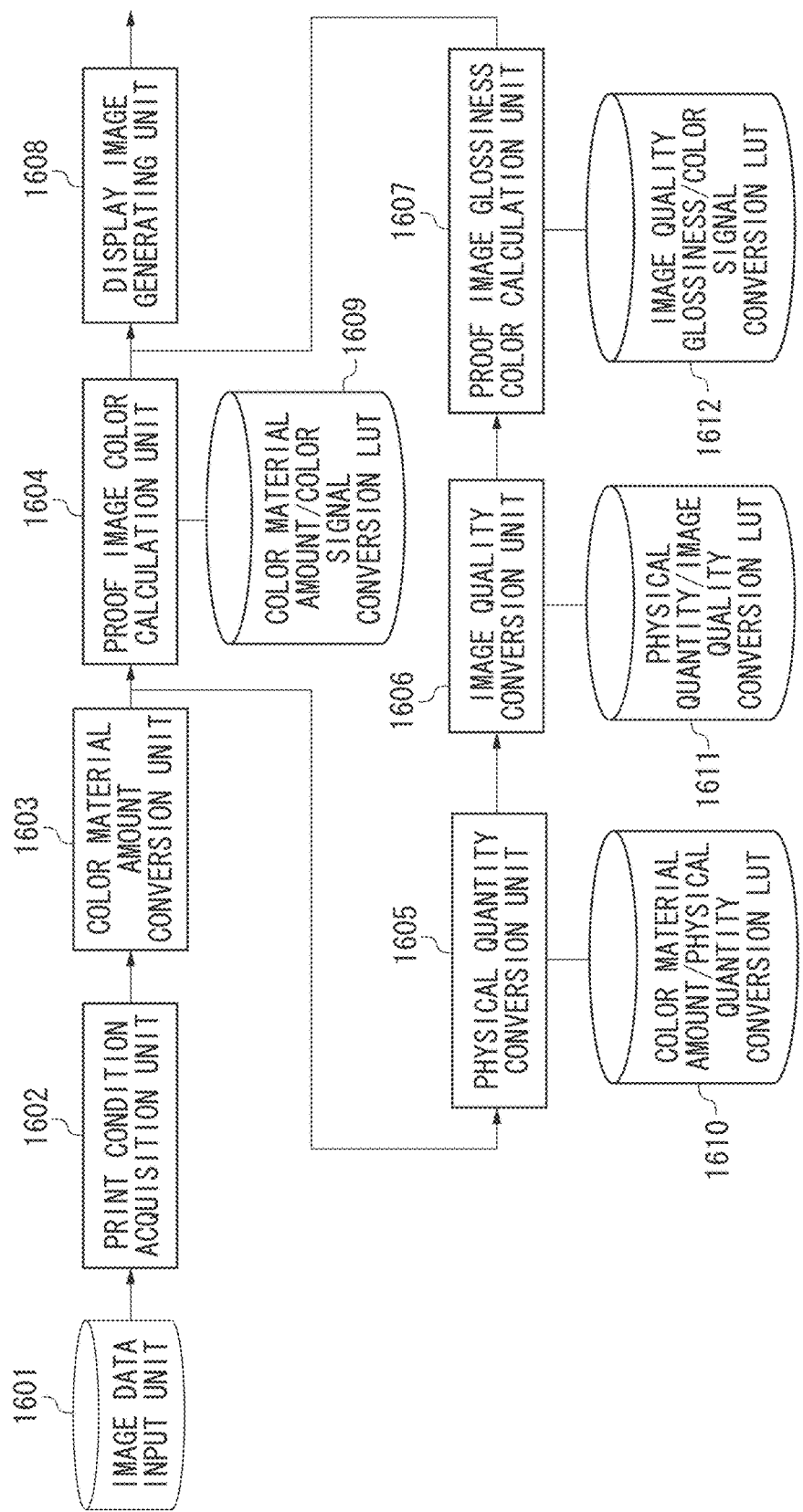
FIG. 16 is a block diagram illustrating the function configuration of an image processing apparatus according to the third exemplary embodiment.

FIG. 16 is a block diagram illustrating the function configuration of the image processing apparatus according to the present exemplary embodiment. The image processing apparatus includes an image data input unit 1601, a print condition acquisition unit 1602, a color material amount conversion unit 1603, and a proof image color calculation unit 1604. The image processing apparatus also includes a physical quantity conversion unit 1605, an image quality conversion unit 1606, a proof image gloss color calculation unit 1607, and a display image generating unit 1608. The image processing apparatus further includes a color material amount/color signal conversion LUT 1609, a color material amount/physical quantity conversion LUT 1610, a physical quantity/image quality conversion LUT 1611, and an image quality gloss/color signal conversion LUT 1612.

The image data input unit 1601 is configured to input and temporarily store image data to be proofed by the image processing apparatus. The print condition acquisition unit 1602 acquires print conditions for printing the image data. The print conditions to be acquired are a recoding medium to be used such as a sheet, conditions for image processing of the printer such as color matching processing, color separation processing, and halftone processing, and conditions for outputting images. The color material amount conversion unit 1603 performs the color separation processing on the image data input by the image data input unit 1601 based on the print conditions acquired by the print condition acquisition unit 1602, thereby converting the image data into a color material amount.

The proof image color calculation unit 1604 converts the color material amounts into color signal values such as L*a*b* by use of the color material amount/color signal conversion LUT 1609. FIG. 18 illustrates an example of the color material amount/color signal conversion LUT 1609. The color material amount/color signal conversion LUT 1609 describes the relationship between the respective color material amounts of CMYK and the color signal values of L*a*b*. The color material amount/color signal conversion LUT 1609 is generated as follows. First, a combination of the color material amounts for each grid point of the LUT is generated. Then, based on the generated combinations of the color material amounts, the printer 94 outputs a patch image. The output patch image is measured with a measuring instrument such as a spectrophotometer to acquire color signal values of L*a*b*. The relationship between the color material amounts of each grid point of the LUT and the color signal values obtained by the measurement is described, so that the color material amount/color signal conversion LUT is generated.

The physical quantity conversion unit 1605 converts the color material amounts into physical quantity signals by use of the color material amount/physical quantity conversion LUT 1610. FIG. 19 illustrates an example of the color material amount/physical quantity conversion LUT 1610. The physical quantity signals represent the surface refractive index and the surface roughness. As described above, the surface refractive index is calculated from the refractive index of each color material and the refractive index of the recording medium, and the surface roughness is calculated from the specular glossiness 202 obtained using the specular glossiness value 201 measured in detail and the refractive index of the image surface.

The image quality conversion unit 1606 converts the physical quantity signals into image quality evaluation values by use of the physical quantity/image quality conversion LUT 1611. As illustrated in FIG. 3 described above, the physical quantity/image quality conversion LUT 1611 describes the relationship between the surface refractive index and the surface roughness with respect to the specular glossiness and the image clarity.

The proof image gloss color calculation unit 1607 converts the specular glossiness and the image clarity, which are image quality evaluation values, into color signal values such as L*a*b*, by use of the image quality gloss/color signal conversion LUT 1612.

The display image generating unit 1608 generates display image data to be displayed on the display device based on the color signal values calculated by the proof image color calculation unit 1604 and the color signal values calculated by the proof image gloss color calculation unit 1607. The display image data is also referred to as soft proof image data or reproduction image data.

Figure 17:
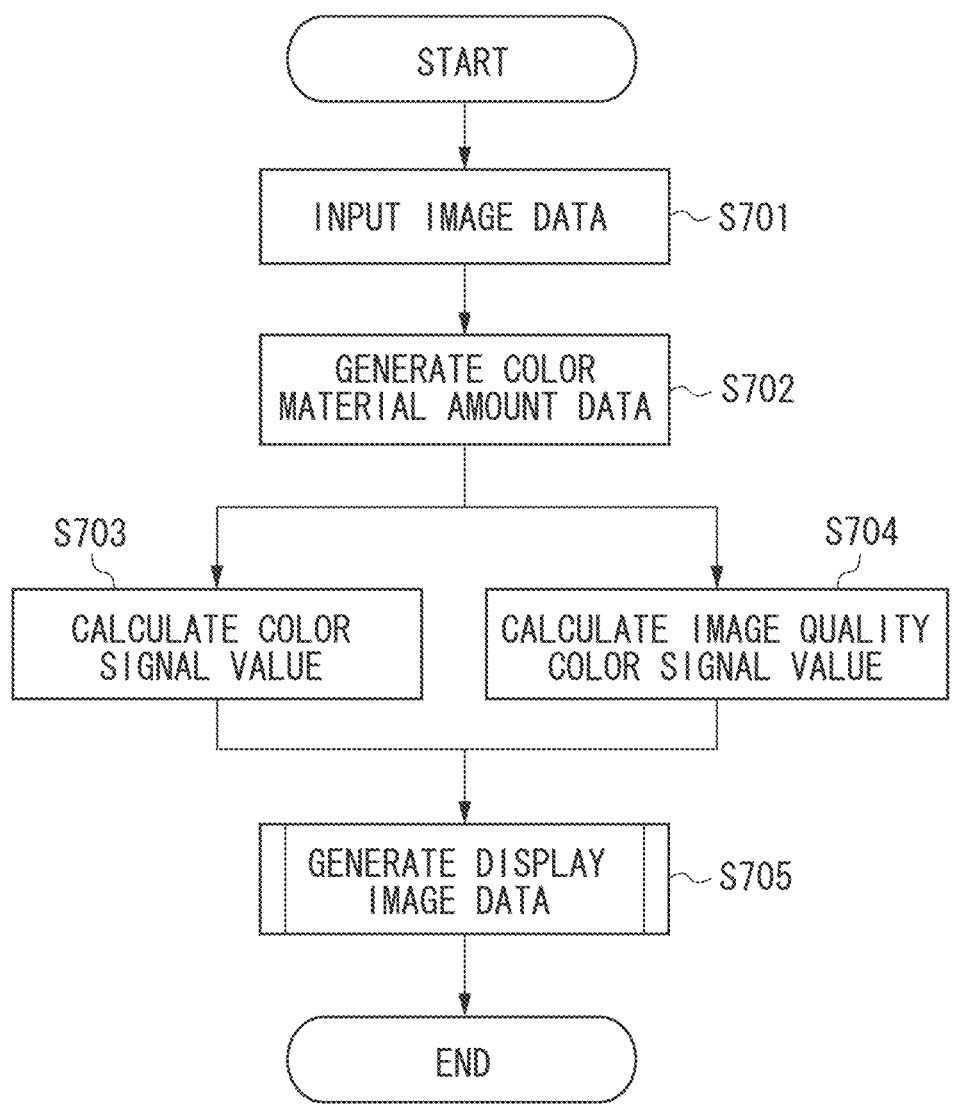
FIG. 17 is a flow chart that is executed by an image processing apparatus according to the third exemplary embodiment.

<Process Flow of Image Processing Apparatus>
FIG. 17 is a flow chart illustrating a flow of a process that is executed by the image processing apparatus. The following describes a series of operations of the image processing apparatus, with reference to the flow chart in FIG. 17. The CPU 901 executes each step of the flow chart by use of the ROM 902 and the RAM 903.

In step S701, the CPU 901 inputs image data. While R(red)G(green)B(blue) image data is input in the present exemplary embodiment, image data to be input is not limited to the RGB image data. For example, CMYK image data may be input. In step S701, image data to be proofed is input.

In step S702, the CPU 901 generates color material amount data from the image data input in step S701. In step S702, first, the print condition acquisition unit 1602 acquires the print conditions. Then, the color material amount conversion unit 1603 performs the color separation processing to convert the image data into, for example, CMYK color material amount data. The color material amount data specifies the amounts of color materials used in printing by the printer, i.e., the ink amounts of the respective colors to be used. Specifically, the color material amount data specifies in, for example, an 8-bit value (0-255) the amount of each color material in the printer that is to be used in printing.

In step S703, the CPU 901 calculates device-independent L*a*b* color signal values from the color material amount data converted in step S702. In step S703, the proof image color calculation unit 1604 processes the color material amount data and performs interpolation calculation by reference to the color material amount/color signal conversion LUT 609, whereby the color signal values of L*a*b* are calculated from the color material amount data. The calculated color signal values are output to step S705.

In step S704, the CPU 901 calculates image quality color signal values from the color material amount data converted in step S702. The target image quality is the gloss image quality and indicates the specular glossiness and the image clarity. First, the physical quantity conversion unit 1605 performs interpolation calculation by reference to the color material amount/physical quantity conversion LUT 1610 to first convert the color material amount data into a physical quantity signals. As described above, the physical quantity signals are the surface refractive index and the surface roughness. Then, the image quality conversion unit 1606 converts the physical quantity signals into values of the specular glossiness and the image clarity. At this time, reference is made to the physical quantity/image quality conversion LUT 1611. Then, the proof image gloss color calculation unit 1607 calculates gloss color signal values from the image quality evaluation values of the specular glossiness and the image clarity.

In step S705, the CPU 901 generates display image data from the color signal values calculated in step S703 and the gloss color signal values calculated in step S704 and displays the display image data on the display device. In the present exemplary embodiment, a virtual environment for observing a printed material is created, and the display image data is displayed on the created virtual space. Details of step S705 will be described below.

<Step S705: Display of Soft Proof Image>
The processing in step S705 is implemented by the function of the display image generating unit 1608. The following describes an image data display method performed by the display image generating unit 1608. The display image generating unit 1608 visualizes a printed material and an illumination on the virtual space, calculates the position of a reflected illumination image from the position of the printed material, the position of the illumination, and an observing position, and displays image data based on the color signal values of the portions where the illumination image is reflected and the color signal values of the portions where the illumination image is not reflected. FIG. 20 illustrates details of the process flow in step S705.

Figure 21A:
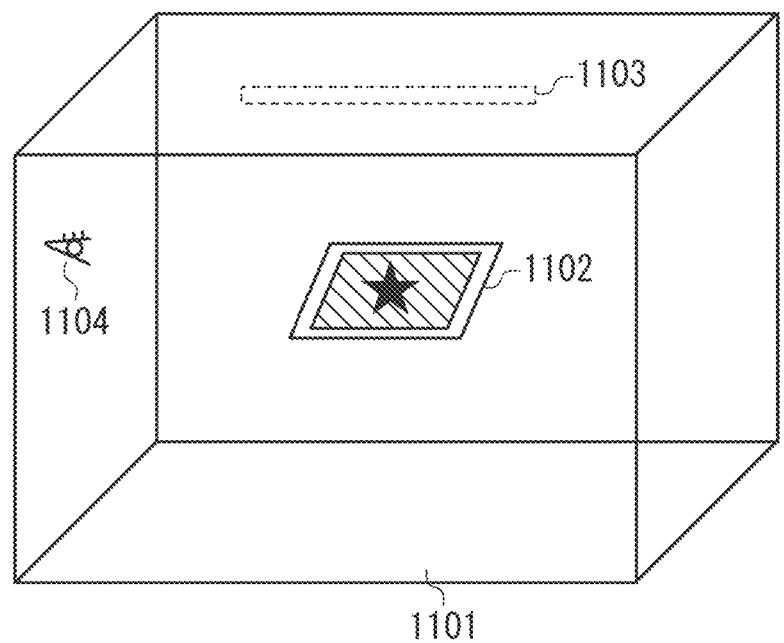
FIG. 21A is a schematic view illustrating a virtual space where an illumination and a printed material are displayed.
Figure 21B:
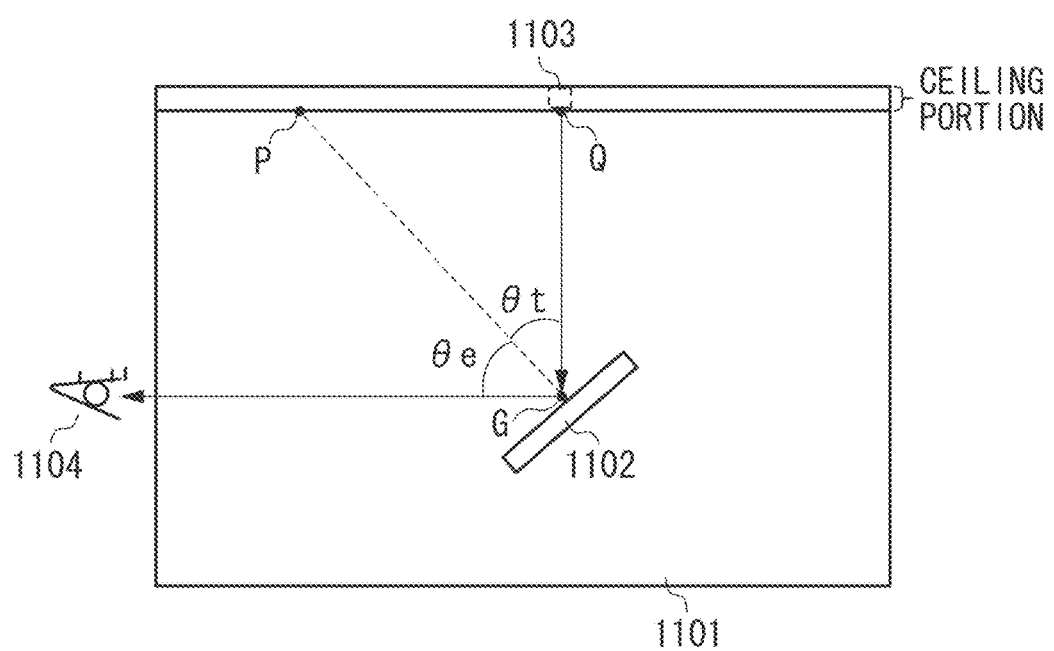
FIG. 21B is a cross-sectional view illustrating the virtual space.

In step S2001, the CPU 901 sets a virtual space to create an environment for observing a printed material. FIG. 21A is a schematic diagram illustrating an example in which the illumination and the printed material are displayed on the virtual space. FIG. 21A illustrates a virtual space 1101 where objects such as a wall, a ceiling, and a floor are arranged. A printed material 1102 and an observing position 1104 are arranged at a central portion of the virtual space 1101, and an illumination 1103 is arranged at an upper portion. While the present exemplary embodiment describes the example in which the printed material and the illumination are used in the virtual space, this is a mere example of the arrangement, and the arrangement is not limited to that described in the present exemplary embodiment. For example, an image display space may be configured using a CG model designated by the user as an input. In step S2002, the CPU 901 calculates the position of a pixel where the illumination image is reflected, from the printed material 1102, the illumination 1103, and the observing position 1104 that are set in step S2001. FIG. 21B illustrates an example of a cross sectional schematic diagram of the virtual space. The position of a pixel where the illumination image is reflected is determined from geometric conditions under which the printed material 1102, the illumination 1103, and the observing position 1104 are set. In FIG. 21B, a dotted line represents a normal vector of the printed material 1102. An angle $\theta_r$ is an angle formed by the illumination 1103 and the normal vector, and an angle 9, is an angle formed by the observing position 1104 and the normal vector. While the angle $\theta_t$ is 45° in the present exemplary embodiment, the angle $\theta_t$ is not limited to 45°. For example, the user may arbitrarily designate the angle $\theta_t$. In FIG. 21B, the illumination 1103 (point Q) provided at the ceiling portion emits light, and the light is reflected at a pixel position (point G) of the printed material 1102. When the virtual space 1101 is observed from the observing position 1104, the illumination image is reflected at the pixel (point G) of the printed material 1102. In step S2002, the CPU 901 calculates the position of the pixel where the illumination image is reflected. Specifically, the CPU 901 scans every pixel of the printed material 1102 to obtain the position of the pixel of the printed material 1102 at which the angle $\theta_t$ is equal to the angle $\theta_e$. The position of the pixel where the illumination image is reflected is specified in step S2002, and then the processing proceeds to step S2003.

In step S2003, the CPU 901 calculates the color signal values of the pixel position calculated in step S2002 where the illumination image is reflected. In the present exemplary embodiment, for each pixel of the input image data to be proofed, the L*a*b* color signal values of the specular glossiness and the image clarity that are calculated by the proof image gloss color calculation unit 1607 as described above are converted into RGB values to be input to a display unit 502. A publicly-known method may be used to convert the L*a*b* into the RGB values.

In step S2004, the CPU 901 calculates the color signal values of the position of a pixel where the illumination image is not reflected. For each pixel of the input image data to be proofed, the color signal values calculated by the proof image color calculation unit 1604 as described above are converted from L*a*b* into RGB values as in step S2003.

In step S2005, the CPU 901 generates display image data of the printed material 1102 from the gloss color signal values calculated in step S2003 and the color signal values calculated in step S2004. Specifically, the CPU 901 generates the display image data using the RGB values obtained in step S2003 for the portion where the illumination image is reflected and the RGB values obtained in step S2004 for the portion where the illumination image is not reflected. The CPU 901 inputs the generated display image data to the display 902 to display the image data and ends the series of operations.

As the foregoing describes, according to the present exemplary embodiment, input image data can be reproduced with high accuracy on a display device such as a display without printing. Furthermore, the specular glossiness and the image clarity, which represent textures of a printed material, can be estimated from the color material amounts (e.g., ink amounts) by use of a small number of patches.

While the present exemplary embodiment describes the example in which the color signal values of the portion where the illumination image is reflected is the gloss color signal values, an effect of the image clarity may be added. Specifically, the intensity may be set to a central portion of the illumination image, and end portions of the illumination image may be displayed with gradually decreasing intensities based on the blur of the image clarity.

While the present exemplary embodiment describes the example of the physical quantity conversion LUT describing the refractive index and the surface roughness with respect to the ink values corresponding to the grid points that are evenly spaced on the input color space, the LUT is not limited to that example. The grid points of the LUT may be arranged densely or loosely according to the ink values. For example, the grid points of the LUT may be arranged such that while the grid points of a highlight portion having a small color material amount and a shadow portion having a large color material amount are loosely, that is, arranged to have a large space between the grid points, the grid points of a halftone portion close to a 50% color material amount are densely, that is, arranged to have a small space between the grid points. The LUT configured to have different grid point arrangements can store in detail portions where a change is significant, whereby the accuracy of estimated values can be increased.

The present disclosure enables calculation of an output value based on not only hues but also textures in the color separation processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-013794 filed Jan. 28, 2014, which is hereby incorporated by reference herein in its entirety.

What is claimed is:

1. An image processing apparatus comprising at least one processor coupled to at least one memory, the at least one processor being programmed to:
input a color signal representing an image and an image quality signal representing a texture of the image;
convert the image quality signal into a physical quantity signal representing a physical quantity; and
determine a color material amount for outputting the image based on the color signal and the physical quantity signal, wherein the image quality signal includes a signal representing glossiness value and a signal representing gloss clarity, and the physical quantity corresponding to the signal representing the glossiness value and the physical quantity corresponding to the signal representing the gloss clarity are a refractive index and a surface roughness of the image, wherein a correlation between the physical quantity signal and the color material amount is higher than a correlation between the image quality signal and the color material amount.

2. The image processing apparatus according to claim 1, wherein the color material amount is determined by interpolation processing using a lookup table storing the color signal and the physical quantity signal, setting at least one of the color signal and the physical quantity signal as an axis.

3. An image processing apparatus configured to generate reproduction image data representing a reproduction image that reproduces on a display device a color and a gloss of a printed material to be printed by a print apparatus, the image processing apparatus comprising at least one processor coupled to at least one memory, the at least one processor being programmed to:

acquire a color signal representing an image, a print condition for printing the image, and a color characteristic of the print apparatus;

convert the color signal into a color material amount based on the print condition;

calculate a color signal of the reproduction image from the color material amount based on the color characteristic of the print apparatus;

convert the color material amount into a physical quantity signal representing a physical quantity;

convert the physical quantity into an image quality signal representing a texture of the reproduction image;

calculate a color signal representing a gloss of the reproduction image from the image quality signal; and generate the reproduction image data from the color signal representing the reproduction image and the color signal representing the gloss, wherein a correlation between the physical quantity signal and the color material amount is higher than a correlation between the image quality signal and the color material amount.

4. The image processing apparatus according to claim 3, wherein the image quality signal is a signal representing glossiness value and a signal representing gloss clarity, and the physical quantity signal is a signal representing a refractive index and a signal representing a surface roughness.

5. The image processing apparatus according to claim 3, wherein the at least one memory stores as a lookup table a relationship between the color material amount and a refractive index and a surface roughness of the printed material, and wherein the at least one processor is further programmed to convert the color material amount into the physical quantity signal by interpolation calculation using the lookup table.

6. The image processing apparatus according to claim 3, wherein the at least one memory stores a relationship between the physical quantity and the image quality signal, and the at least one processor is further programmed to convert the physical quantity into the image quality signal representing glossiness value and gloss clarity based on the relationship stored in the holding unit.

7. The image processing apparatus according to claim 3, wherein the at least one memory stores as a lookup table a relationship between the image quality signal and the color signal representing the gloss, and wherein the at least one processor is further programmed to calculate the color signal representing the gloss from the image quality signal by interpolation calculation using the lookup table.

8. An image processing method comprising:

inputting a color signal representing an image and an image quality signal representing a texture of the image;

converting the image quality signal into a physical quantity signal representing a physical quantity; and determining a color material amount for outputting the image based on the color signal and the physical quantity signal, wherein a correlation between the physical quantity signal and the color material amount is higher than a correlation between the image quality signal and the color material amount.

9. A non-transitory computer-readable storage medium storing a program for causing a computer to execute an image processing method comprising:

inputting a color signal representing an image and an image quality signal representing a texture of the image;

converting the image quality signal into a physical quantity signal representing a physical quantity; and determining a color material amount for outputting the image based on the color signal and the physical quantity signal, wherein a correlation between the physical quantity signal and the color material amount is higher than a correlation between the image quality signal and the color material amount.

10. An image processing method for generating reproduction image data representing a reproduction image that reproduces on a display device a color and a gloss of a printed material to be printed by a print apparatus, the image processing method comprising:

acquiring a color signal representing an image, a print condition for printing the image, and a color characteristic of the print apparatus;

converting the color signal into a color material amount based on the print condition;

calculating a color signal of the reproduction image from the color material amount based on the color characteristic of the print apparatus;

converting the color material amount into a physical quantity signal representing a physical quantity;

converting the physical quantity into an image quality signal representing a texture of the reproduction image;

calculating a color signal representing a gloss of the reproduction image from the image quality signal; and generating the reproduction image data from the color signal representing the reproduction image and the color signal representing the gloss, wherein a correlation between the physical quantity signal and the color material amount is higher than a correlation between the image quality signal and the color material amount.

11. A non-transitory computer-readable storage medium storing a program for causing a computer to execute an image processing method for generating reproduction image data representing a reproduction image that reproduces on a display device a color and a gloss of a printed material to be printed by a print apparatus, the image processing method comprising:

acquiring a color signal representing an image, a print condition for printing the image, and a color characteristic of the print apparatus;
converting the color signal into a color material amount based on the print condition;
calculating a color signal of the reproduction image from the color material amount based on the color characteristic of the print apparatus;
converting the color material amount into a physical quantity signal representing a physical quantity;
converting the physical quantity into an image quality signal representing a texture of the reproduction image;
calculating a color signal representing a gloss of the reproduction image from the image quality signal; and
generating the reproduction image data from the color signal representing the reproduction image and the color signal representing the gloss,
wherein a correlation between the physical quantity signal and the color material amount is higher than a correlation between the image quality signal and the color material amount.

* * * * *